US011551447B2

(12) United States Patent
Kanthan et al.

(10) Patent No.: US 11,551,447 B2
(45) Date of Patent: Jan. 10, 2023

(54) REAL-TIME VIDEO STREAM ANALYSIS SYSTEM USING DEEP NEURAL NETWORKS

(71) Applicant: TagxLabs, Inc, New York, NY (US)

(72) Inventors: Anoop Kanthan, New York, NY (US); Anton Federov, Amsterdam (NL)

(73) Assignee: OmniX Labs, Inc. NY (US)

( * ) Notice: Subject to any disclaimer, the term of this patent is extended or adjusted under 35 U.S.C. 154(b) by 135 days.

(21) Appl. No.: 16/433,642

(22) Filed: Jun. 6, 2019

(65) Prior Publication Data

US 2020/0387713 A1 Dec. 10, 2020

(51) Int. Cl.
*G06V 20/40* (2022.01)
*G06K 9/62* (2022.01)
*G06N 3/08* (2006.01)

(52) U.S. Cl.
CPC .......... *G06V 20/41* (2022.01); *G06K 9/6256* (2013.01); *G06N 3/08* (2013.01); *G06V 20/49* (2022.01)

(58) Field of Classification Search
CPC .................. G06K 9/00718; G06K 9/00765
See application file for complete search history.

(56) References Cited

U.S. PATENT DOCUMENTS

| | | |
|---|---|---|
| 9,373,057 B1 | 6/2016 | Erhan et al. |
| 9,697,444 B2 | 7/2017 | Wu et al. |
| 9,853,861 B2 | 12/2017 | Mazhar et al. |
| 2009/0217315 A1* | 8/2009 | Malik .................... H04N 7/181 725/9 |
| 2010/0266189 A1* | 10/2010 | Knapp .................... G06T 5/008 382/132 |
| 2019/0130191 A1* | 5/2019 | Zhou .................... G06K 9/4604 |
| 2019/0205649 A1* | 7/2019 | Ananthanarayanan ...................... G06K 9/6256 |
| 2019/0327179 A1* | 10/2019 | Millin .................... G06Q 10/06 |
| 2019/0370980 A1* | 12/2019 | Hollander .......... G06K 9/00771 |
| 2020/0210774 A1* | 7/2020 | Jakubowicz ......... G06K 9/6271 |

OTHER PUBLICATIONS

Web GUI, "Features", https://web.archive.org/web/20180602134856/https://www.webgui.org/features, Jun. 2, 2018 (Year: 2018).*

\* cited by examiner

*Primary Examiner* — Amandeep Saini
*Assistant Examiner* — Raphael Schwartz
(74) *Attorney, Agent, or Firm* — M&B IP Analysts, LLC

(57) ABSTRACT

A video processing apparatus includes a registration component that registers configuration information associated with the video information; a filter component that filters the video frame such that all but the area of interest is excluded in a filtered video frame; a configuration component that configures a plurality of neural networks in at least one of a parallel configuration, sequential configuration, mixed parallel and sequential configuration that provides a configured plurality of neural networks; a processing component that processes the filtered video frame using the configured plurality of neural networks that provides insight information; a display that provides insight information to a user; and a storage component that stores the configuration information and insight information in persistent cloud-based storage. A corresponding method of processing video information and computer-readable medium are also disclosed.

22 Claims, 25 Drawing Sheets

REAL-TIME VIDEO STREAM ANALYSIS SYSTEM USING DEEP NEURAL NETWORKS

BACKGROUND

Field

The disclosed embodiments generally relate real-time video processing systems and, more specifically, to real-time video processing using neural networks.

Description of the Related Art

Devices containing cameras that provide video content, such as tablets, smart phones, desktops with integrated webcams, Internet protocol (IP) cameras, and the like, have become ubiquitous in the last decade. There are also many video content media files, such as static video files and static image files. However, without post-processing, such video content represents no more than a flow of images. Conventional techniques do not provide a way to effectively analyze the actual video content to determine the objects being recorded and their attributes. However, providing this information is critically beneficial to all types of consumers—from individuals to large enterprises.

Deep neural networks of various types have recently gained widespread popularity by providing new ways to process individual images including object detection, segmentation, and classification. Neural networks can be used to answer questions, such as what objects are on the image, where these images are located on the image, and what traits these images possess. Unfortunately, applying conventional neural network as tools can only process individual images rather than video streams, and can represent only very raw individual units that require a great deal of refinement before their output is suitable for presentation to human users.

Some solutions have been created that provide per-image analysis of video content via neural networks. However, these techniques require customers to buy expensive pre-packaged hardware products, such as cameras with integrated general processing units (GPUs); require installation on powerful, but costly hardware that customers must purchase; provide analytical features that are too simplistic, thereby making these solution useful for only a narrow set of tasks; cannot work on mobile devices; and/or can only process static images or static pre-recorded videos.

SUMMARY

The disclosed embodiments relate to a video processing apparatus, which includes: a registration component, the registration component registering configuration information associated with the video information, the configuration information comprising at least one of access information, communication information, metadata, area of interest, analysis information, processing information; a filter component, the filter filtering the video frame such that all but the area of interest is excluded in a filtered video frame; a configuration component, the configuration component configuring a plurality of neural networks in at least one of a parallel configuration, sequential configuration, mixed parallel and sequential configuration that provides a configured plurality of neural networks; a processing component, the processing component processing the filtered video frame using the configured plurality of neural networks that provides insight information; a display, the display providing the insight information to a user; and a storage component, the storage component storing the configuration information and insight information in persistent cloud-based storage.

The area of interest may be represented as a polygon, and the video information may include at least one of a live video stream, pre-recorded video stream, standalone individual video frame, image. The insight information may be based on an object detected in the filtered video frame and attributes associated with the object, and the plurality of neural networks may include a deep neural network. The video processing apparatus may train the plurality of neural networks to process an image comprising at least one of a predefined dimension, dynamic dimension.

The disclosed embodiments may also relate to a method of processing video information, the video information comprising a video frame, wherein the method includes: registering configuration information associated with the video information, the configuration information comprising at least one of access information, communication information, metadata, area of interest, analysis information, processing information; filtering the video frame such that all but the area of interest is excluded in a filtered video frame; configuring a plurality of neural networks in at least one of a parallel configuration, sequential configuration, mixed parallel and sequential configuration that provides a configured plurality of neural networks; processing the filtered video frame using the configured plurality of neural networks that provides insight information; providing the insight information to a user; and storing the configuration information and insight information in persistent cloud-based storage.

The method may include representing the area of interest as a polygon, and the video information may include at least one of a live video stream, pre-recorded video stream, standalone individual video frame, image. The method may include: configuring video content metadata that provides configured video content used in processing the filtered video frame; configuring the area of interest; and storing the configured video content metadata and the configured area of interest in the persistent cloud-based storage. The insight information may be based on an object detected in the filtered video frame and attributes associated with the object, and the method may include providing the insight information in response to receiving a request for video frame processing. The plurality of neural networks may include a deep neural network, and the method may include training the plurality of neural networks to process an image comprising at least one of a predefined dimension, dynamic dimension. The method may include training the plurality of neural networks to process at least one of a black-white image, color image. The method may include: scaling up a computational resource associated with the plurality of neural networks in response to receiving configuration information comprising video information to be processed, the scaling up comprising requesting a cloud provider API to provide additional computational resources; and scaling down computational resources in response to receiving a stop command, the scaling down comprising requesting the cloud provider API to release existing computational resources used for processing the filtered video frame. The method may include configuring a processing pipeline comprising the insight information that provides an aggregation; executing the configured processing pipeline; and storing the aggregation in the persistent cloud-based storage. The method may include providing a WebGUI access to the aggregation in response to a request to initiate calculation and retrieval of the aggregation, and providing an API access to the aggregation in response to a request to initiate calculation and retrieval of the aggregation, WebGUI being an open source content management system released under the GNU General Public License.

The disclosed embodiments may also relate to a computer-readable medium storing instructions that, when executed by a processing device, perform operations including: registering configuration information associated with the video information, the configuration information comprising at least one of access information, communication information, metadata, area of interest, analysis information, processing information; filtering the video frame such that all but the area of interest is excluded in a filtered video frame; configuring a plurality of neural networks in at least one of a parallel configuration, sequential configuration, mixed parallel and sequential configuration that provides a configured plurality of neural networks; processing the filtered video frame using the configured plurality of neural networks that provides insight information; providing the insight information to a user; and storing the configuration information and insight information in persistent cloud-based storage.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIG. 22 shows a flowchart of a process embodiment performed by a push API execution component of the video stream real time analysis system;

Figure 1:
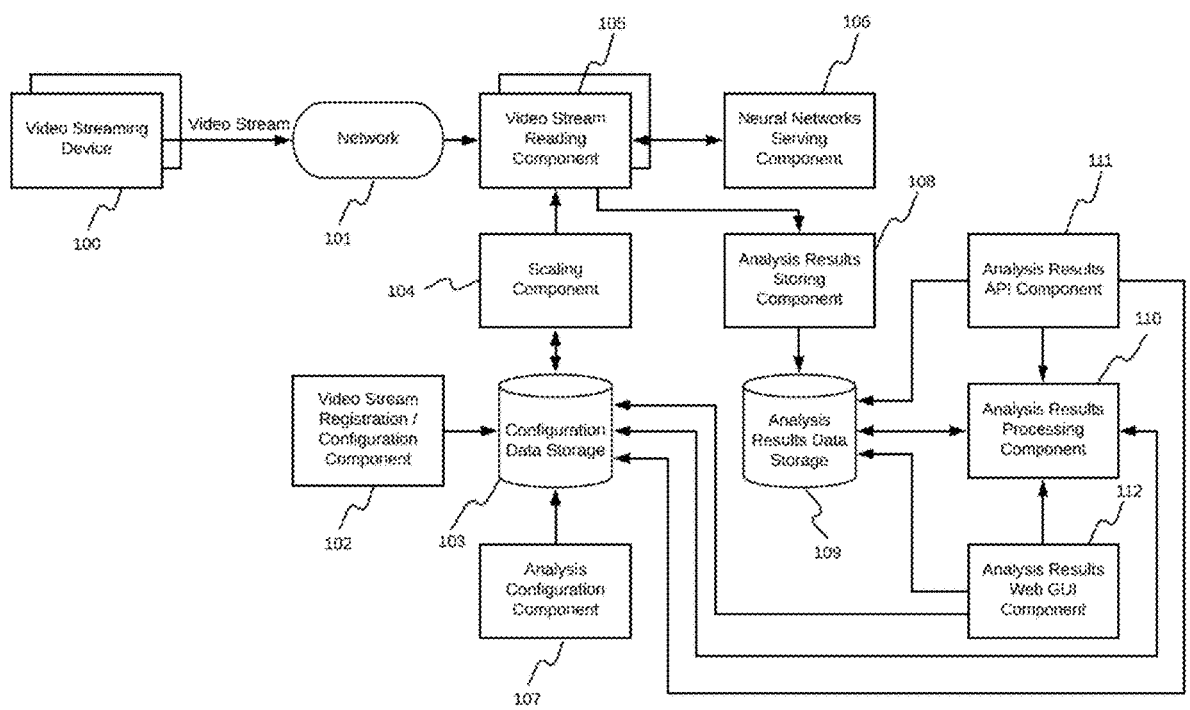
FIG. 1 shows a block diagram of an architectural embodiment for a real-time video stream analysis system.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

A real-time video stream analysis system, as described herein, is a cloud-based, scalable solution that provides real-time processing and analysis of video streams derived from any video source including, but not limited to, an Internet protocol (IP) camera, tablet, phone, pre-recorded videos, static images, and the like. The system does not require any hardware and/or software installation on a video provider side; performs all computational processes, thereby making the associated video device responsible only for providing a real-time video stream; is capable of processing video content using an extensible set of deep neural networks; and provides techniques for presenting analytical results using graphical user interface (GUI) or real-time application programming interface (API) callbacks.

Embodiments of the system capable of processing multiple video streams using deep neural networks in real-time are disclosed herein. One or more video stream sources, such as IP cameras, mobile devices, desktop computers, and the like, are registered by the system. The system connects to these registered sources and begins processing video streams. Each of the video streams is processed using one or more deep neural networks that may be executed in parallel and/or in series or sequentially, to improve and/or clarify results provided by previously used neural network(s). The results generated by these neural networks is post-processed by the system to produce higher- or lower-level insights or reports regarding objects observed in the video stream and attributes associated with these objects. These insights are accessible using real-time notifications, callbacks, and/or can be accessed using a web-based interface associated with the system.

Components of the system can be divided into components that are external and reside on a customer side, and components that reside in a cloud computing engine. Components residing on the customer side include video streaming devices, such as mobile devices, IP cameras, desktops, and the like. A function of these components is to provide input to the system in the form of video streams. In order for the system to be aware of the video streams, metadata associated with the video streams is registered in the system. The system assumes that this metadata is registered by a system engineer or user and includes information regarding how to access the video streams.

The system provides multiple techniques for initializing access to the video streams, which include a non-secure direct uniform resource locator (URL) for the video streams, a direct URL for the video streams with virtual private network (VPN) settings, a video stream push configuration, a video stream push configuration over a transport layer security (TLS)-protected connection, and/or the like. The first two options provide system access video streaming using server-to-client insecure/secure communication, respectively, and the latter two options support client-to-server insecure/secure communication, respectively.

The remaining components of the system are intended to be located in the cloud, but can be located in any other location as well. Accordingly, the system runs completely in the cloud and provides a service for customers that frees customers from the need to have software and/or hardware installed or configured on the customer side.

It should be noted that although this disclosure primarily uses the term video stream when describing input to the system, this term is intended to refer to any one or more of a live real-time video stream, a static pre-recorded video stream, a static image representing a video stream of a single frame, and/or the like without limitation. It should be noted that while this disclosure provides methods for processing video streams, the same methods can be applied to processing static videos and static images as well.

Components located in the cloud include, but are not limited to, a video stream registration/configuration component, video stream reading component, scaling component, neural networks serving component, analysis configuration component, analysis results storing component, analysis results processing component, analysis results API component, and analysis results web GUI component.

The video stream registration/configuration component is responsible for entering access information concerning the video stream, such as the direct URL, VPN settings, push configuration, and/or the like. In addition to access configuration, the video stream registration/configuration component is also responsible for defining areas of interest in the video frames, and marking regions that the system is to analyze using neural networks. These features enable consumers to configure those regions that are to be processed in cases in which the video stream represents a camera location that provides more information than that which the consumer is interested.

The primary task of the video stream reading component is to connect to and/or accept (depending on whether the video stream is configured using a pull or push configuration) the video stream from the end consumer device, apply modifications to the input video (so that only a minimum amount of computational resources are used in video processing), split video streams into frames, forward video streams to the next component (such as the neural networks serving component), accept analysis results from the neural networks serving component, send analysis results to provide persistence to the analysis results storing component, and send results from the neural networks adaptor component to the analysis results API component. Embodiments disclosed herein may face the necessity of tracking particular objects throughout a video stream. For example, there can be a requirement to track movements of a specific vehicle in a video in order to compute its speed, location, movement, and the like. In order to perform these tasks, it is not possible to merely perform object detection using neural networks on individual frames. First, it is not technically optimal to perform neural network processing of each frame at typical video speeds of thirty (30) frames per second. Second, object detection when performed on individual frames does not include information regarding objects detected from previous frames, which means that there is no way to determine, for example, whether or not two objects in two video frames represent the same object. In order to solve this problem efficiently, algorithms are available for performing object tracking over video streams, such as MIL, KCF, TLD, MOSSE, GOTURN, and the like. Essentially, these algorithms are capable of providing bounding boxes (with relative/absolute coordinates) around each detected object, and updating coordinates of each bounding box as the detected objects move throughout the video stream. Each of these algorithms requires every video frame (regardless of the speed of the video) as input, which renders this task possible to be performed completely by the video stream reading component, in which all video frames are available. The disclosed embodiments do not require any particular video tracking algorithm to be used, but rather provides the ability to perform such tracking logic.

The scaling component is responsible for integration between the system and a cloud engine provider. When the system receives a new registered video stream, the scaling component receives the video stream metadata and requests computing resources from the cloud provider by interacting with an API associated with the scaling component. In this way, the system performs scaling up to adjust to an increasing number of registered video streams. When the system is notified that one or more specific video streams is no longer in need of processing, the system notifies the cloud provider to shutdown computing resources that were dedicated to working with the one or more specific video streams. In this way, the system performs scaling down to save resources whenever a customer decides to stop providing one or more video streams.

The neural networks serving component is responsible for hosting and serving neural networks that are configured for the system. The neural networks serving component is capable of serving different neural networks, adding new neural networks, removing neural networks, and/or serving different versions of the same neural network. The neural networks serving component also addresses issues associated with each neural network having its own format of input and output, and different requirements between neural networks regarding input image pre-processing, such as greyscale, resizing, normalization, and the like. The system is intended operate with different types of image-processing neural networks, which are handled by the unified interface provided by the neural networks serving component. The neural networks serving component also provides extensibility of objects that the system can detect in video streams, as well as extensibility of object attributes that can be classified by having multiple neural networks. This extensibility is possible due to the nature of the neural networks training process. It is difficult and time consuming to implement a single neural network that can detect many types of objects, such as cats, dogs, vehicles, airplanes, ships, and the like with a high confidence level. Instead, multiple neural networks can be trained to be more focused on a single or limited number of object types. For example, one neural network can be trained to detect cats and dogs, another neural network can be trained to detect vehicles, another neural network can be trained to detect airplanes, and yet another neural network can be trained to detect ships. In this manner, improved processing performance and accuracy of detection is achieved. Since the neural networks serving component can include multiple neural networks, and neural networks can be dynamically added to the neural networks serving component, the actual set of object types that the system can detect is automatically extended with each new type of neural network added to the neural networks serving component. The same logic applies to the extensibility of object attributes classification that the system can perform by using multiple neural networks for subgroups of attributes of interest.

An important feature of the neural networks serving component is that it not only makes it possible to process video frames from video streams using multiple neural networks in parallel, but it further enables chaining the video frames or configuring the neural networks in series or sequentially. The term chaining, as used herein, refers to the ability to process an initial video frame using some neural networks, and then provide the results of this processing, together with the initial video frame or portions of the initial video frame, as input to other neural networks, as well as iterations of this process. These features enable detailed information concerning attributes of objects detected in the video stream to be extracted.

Since the system assumes that multiple neural networks are available for processing, the system may not be able to provide real-time analysis if each of the multiple neural networks is applied to all video streams and to each video stream frame. Accordingly, the analysis configuration component configures which one or more of the neural networks to use in any given analysis process concerning each frame of each individual video stream. Thus, the analysis configuration component provides configuration flexibility and saves computational resources by communicating with only those neural networks that are required and/or selected. The analysis configuration component also configures a customer endpoint that receives results of an analysis. This configuration is performed by persisting the address of the customer API endpoint (DNS Name, IP Address, HTTP URL, and the like), which the customer provides to the system during their onboarding process in the configuration data storage. In addition to the address of the endpoint itself, access credentials are also specified, such as an API Token, Login/Password, and the like. This configuration is provided as an input to the analysis results API component, and is later used as a target endpoint to automatically provide analysis results, which enables customers to automatically receive results concerning processing of their registered video streams.

The analysis results storing component is responsible for persistence of analysis results provided by the neural networks. These analysis results can be of various types and/or formats, which include, but are not limited, to an analysis result for each individual video frame, a summary analysis result over a specific time window, and/or the like.

The persistence of these results enables the system to process these results using the analysis results processing component, an output of which is provided as an input to the analysis results API component and/or analysis results web GUI component. The system can also omit the processing step and provide analysis results without further processing to the analysis results API component and/or analysis results web GUI component.

The analysis results processing component is responsible for accepting neural network analysis results from the analysis results storing component as input, and processing the network analysis results by applying transformations, aggregations, querying, and/or the like to provide higher level analysis results, that is, meaningful insights from the raw neural network analysis result so that valuable analytics can be provided to the customer. For example, the analysis results processing component may be configured to count all objects detected in a particular video stream during a particular day, or report if a particular object was detected at a particular frame of a video stream. Thus, the analysis results processing component provides reporting and aggregation capabilities for the system.

The system is fully automatable by configuring the analysis results API component to automatically report analysis results to customers using a push API, as well as enabling customers to request specific analysis results instantly using a pull API. The push API can be triggered on a per-event, per-frame, per-time-interval, and/or the like basis. The analysis results API component is responsible for gathering required analysis results and providing these results to one or more registered customer endpoints.

The analysis results web GUI component provides a visual representation of analysis results from neural networks on a Web GUI. The analysis results web GUI component provides a non-automated technique of reporting that can be used as an alternative or supplement to reporting results in an automated manner by the analysis results API component.

One of the goals of the system is to provide real-time analysis of multiple video streams by analyzing video streams frame-by-frame, feeding frames to one or more neural networks, reading processed results from the neural networks, optionally processing and aggregating these processed results, and providing analysis results to a customer by API or Web GUI. A detailed description of the system architecture and functions performed by the components thereof, as well as a description of communication between these components follows.

FIG. 1 illustrates an embodiment of the system architecture. The architecture includes a plurality of video streaming devices 100, and a network 101 that connects the plurality of video streaming devices 101 to the system. The system includes the video stream registration/configuration component 102, configuration data storage 103, scaling component 104, video stream reading component 105, neural networks serving component 106, analysis configuration component 107, analysis results storing component 108, analysis results data storage 109, analysis results processing component 110, analysis results API component 111, and analysis results Web GUI component 112.

Figure 2:
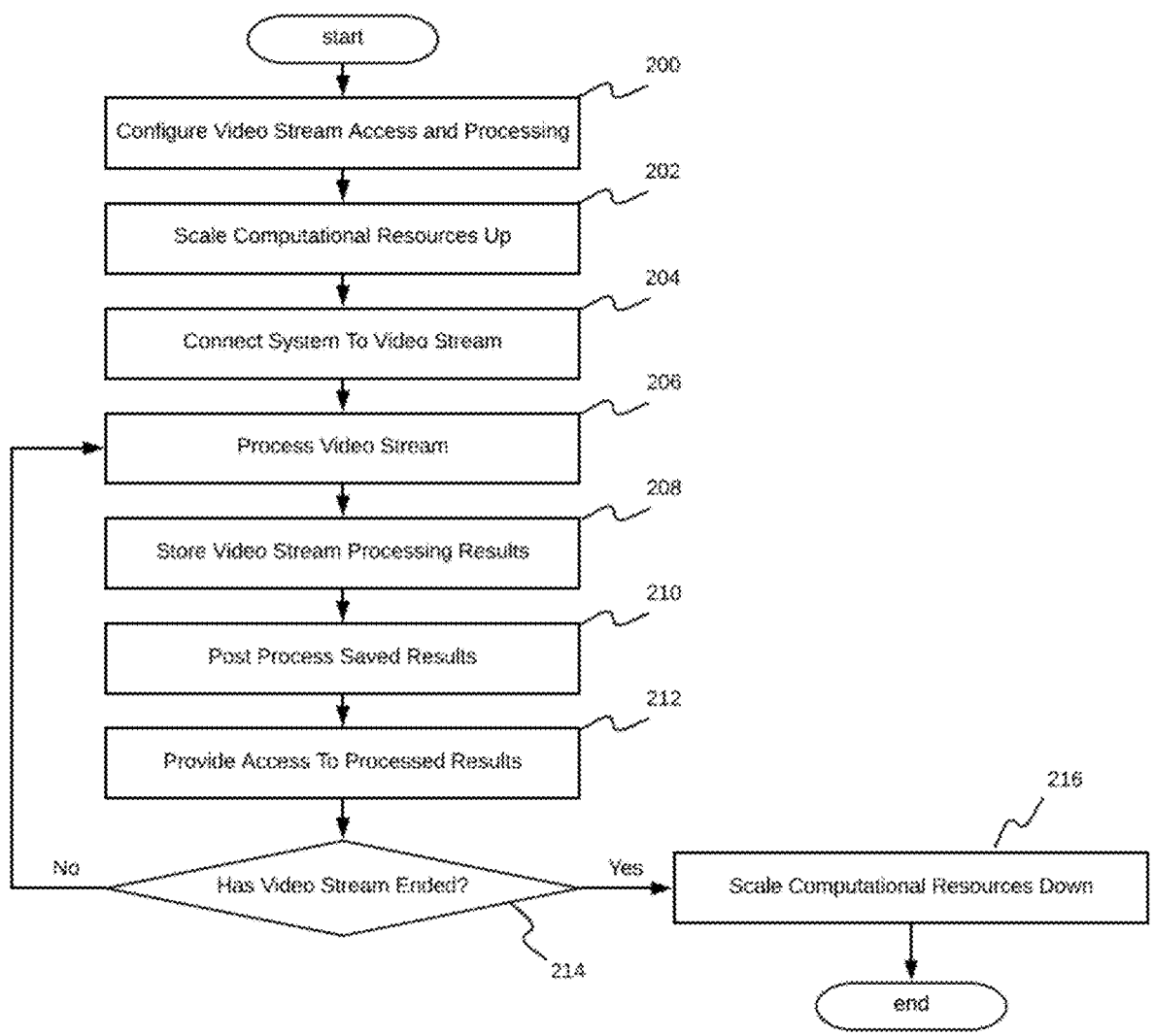
FIG. 2 shows a flowchart of a video stream processing embodiment performed by the real-time video stream analysis system.

FIG. 2 shows an illustrative flowchart of video stream processing embodiment performed by the real-time video stream analysis system. The process includes configuring access to the video stream and how the video stream is to be processed in step 200, which includes defining those features that the system should locate in the video stream, defining which neural networks are to be used, defining a schedule for push API communication, and/or the like; scaling computational resources in step 202 so that the system has sufficient resources to process the video stream; connecting the video stream to the system and reading the video frames from the video streaming device 100 by the system in step 204; processing the video frames using the configured neural networks (NN) and corresponding post-processing to extract configured features from results provided by the NN in step 206; storing results of the processing into persistent storage in step 208; post-processing of the stored results to provide higher-level analytics in step 210; providing access to the high-level analytics using the API or GUI in step 212; determining if the video stream has ended or finished in step 214; and scaling computational resources down if the video stream has ended or in response to the system being instructed to stop processing the video stream in step 216, or returning to process the video stream in step 206. The process included in each of these steps is further described below.

The system provide functionality using information associated with video streams that that the system processes. Two properties of video streams that can be configured are (1) communication configuration, which describes how the system can connect to the video streaming device 100, and (2) analysis configuration, which describes what neural networks are to be used for video stream processing and how the results of this processing are to be communicated to the customer.

Embodiments of the system can implement different techniques for configuring communication. Two primary types of communication that have a significant effect on what configuration should be used, and thus actual implementations of these embodiments, are described as follows.

A first type of communication represents a model, in which the system initiates connection to the video streaming device 100, that is, the connection starts from a server and proceeds to the client. Since the majority of video streaming devices 100, such as IP cameras, mobile devices, desktops, and/or the like are connected using the Internet, these device are accessible by the system. With the current level of Internet usage, this feature indicates that the video streaming device is configured to be public, which may induce security concerns. These security concerns become more serious if the video streaming device 100 operates over a video streaming real-time screening protocol (RTSP) protocol, which passes credentials in an open manner. In order to guarantee safety under these conditions, a virtual private network (VPN) is used and the video streaming device 100 is registered in the VPN. The system is also configured with VPN access and is able to connect to the VPN. Additional steps in such a communication configuration include configuration of the VPN server, local network gateway exposure via a public Internet address and/or dynamic domain name server (DNS), and/or local network gateway port forwarding configuration to forward VPN/RTSP ports. Examples of these configurations for server-to-client communications include video device RTSP URL, RTSP credentials, VPN host address, VPN port, VPN credentials, VPN certificate, VPN type, and/or the like.

The second type of communication represents a model, in which communication between the video streaming device 100 and system is initiated by the video streaming device 100 that operates in accordance with a client-to-server mode. As in the server-to-client mode, there are numerous ways of configuring such a communication. The majority of these configurations use custom software operating on the video streaming device 100, such as an IP camera, mobile device, desktop, and/or the like, that connects to the system over the Internet and sends video frames to the system. Implementing these communications using transport layer security (TLS) protocol secures these communications. Such a configuration also removes the need for configuring the VPN or local network gateway configuration for the customer. Details concerning this configuration are or may be implementation-specific. Examples of configurations for client-to-server communications include providing an application token for the custom software running on the video streaming device 100.

Figure 3:
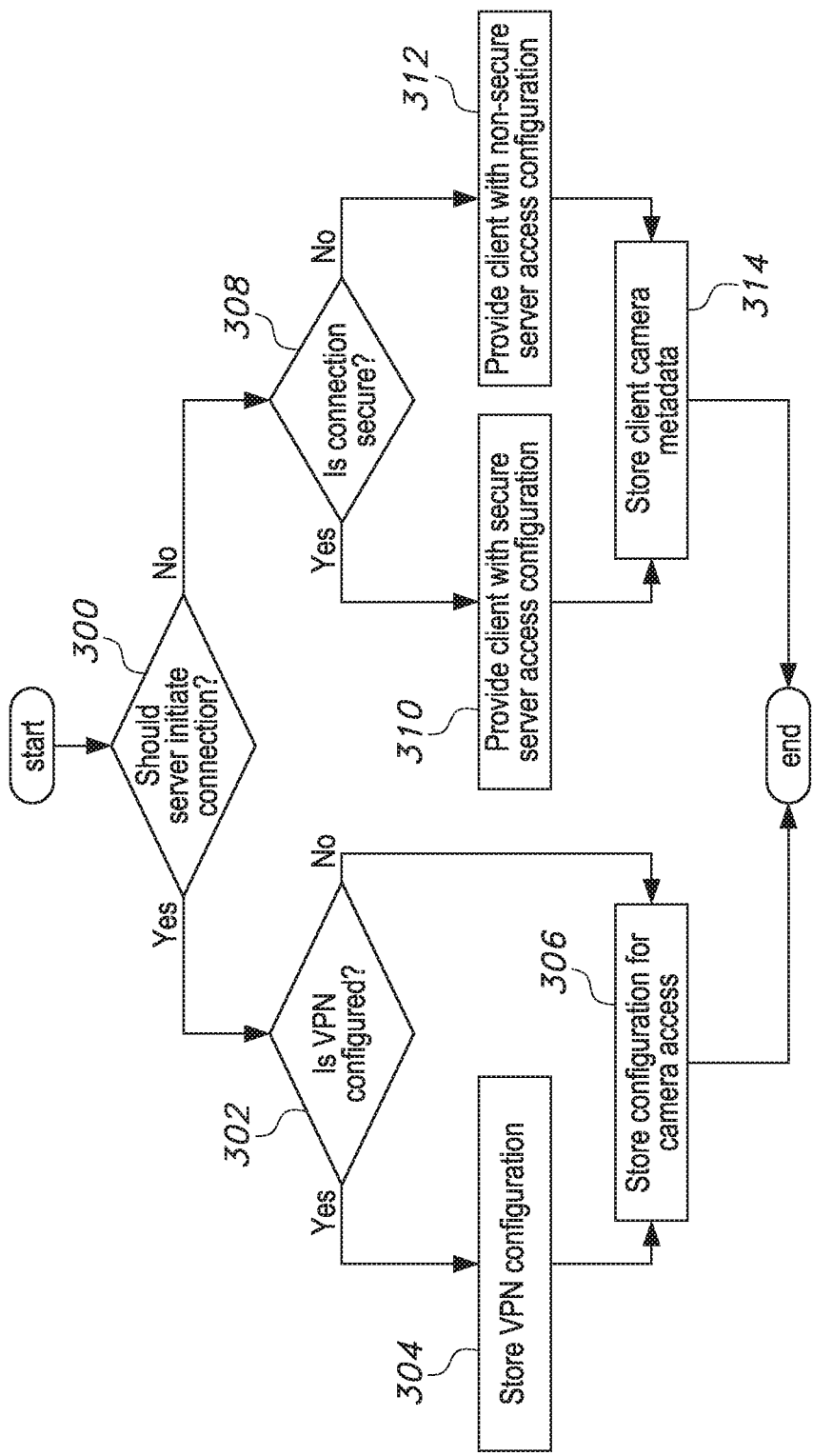
FIG. 3 shows a flowchart of a process embodiment performed by a video stream access configuration component of the real-time video stream analysis system.

FIG. 3 is a flowchart showing an embodiment of the process performed by the video stream access configuration component as described above. The system is provided with information indicating that a communication is assumed to be a server initialized connection to the video streaming device 100 or a client initialized connection to the video streaming device 100 and this determination is made in step 300. In cases where the server is to make the connection, the system is configured with information regarding whether a VPN is configured, which is determined in step 302, and its configuration information is stored in step 304. Using this information, the system is able to configure the video stream reading component 105 using a VPN so that the system has access to the video streaming device 100, and this information is stored in step 306. Regardless of whether the VPN is present or not, the next configuration step is to provide the system with an access URL to the video stream, which is typically an RTSP URL. This configuration information suffices for the system to be able to connect to the video streaming device 100.

If the connection is initiated from the client to the server, a primary goal is to provide a customer with a URL, which enables access to the video stream reading component 105. For this, the system routes requests targeted to a certain URL directly to the video stream reading component 105. This technique depends on architectural details that are or may be implementation-specific. For simplicity, it can be assumed that the URL provided to customers can either be secure (e.g., via TLS) or non-secure, the determination regarding which is performed in step 308. In this case, when the video streaming device 100 initiates connection to the system, a request is routed to the dedicated video stream reading component 105, which confirms the connection and starts reading video frames. The system can require metadata associated with the video streaming device 100 to confirm that only a specific video streaming device 100 is able to connect. Secure server access configuration information is stored in step 310, non-secure server access configuration information is stored in step 312, and metadata associated with the video streaming device 100 is stored in step 314. An important aspect of the client-server communication is that the video streaming device 100 is able to reinitiate a connection if an established connection is terminated. As this is not a trivial task, a preferred approach for the system is the server-to-client connection establishment.

Examples of additional registration and/or configuration information regarding video stream devices 100 includes a name of the video streaming device 100, rate of the video stream (e.g., frames per second), width and height of the video frames, bit rate of the video stream, video-codec of the video stream, and/or the like.

The video stream registration/configuration component 102 handles these configurations regardless of the communication type, metadata information associated with the video stream device 100, and/or video stream attributes implemented. The video stream device 100 information can be entered manually by the customer using the GUI and/or can be entered using an automated API. So that the entered configuration persists, the entered information is saved by the video stream registration/configuration component 102 into the configuration data storage 103, which is a cloud-based database engine.

Figure 4:
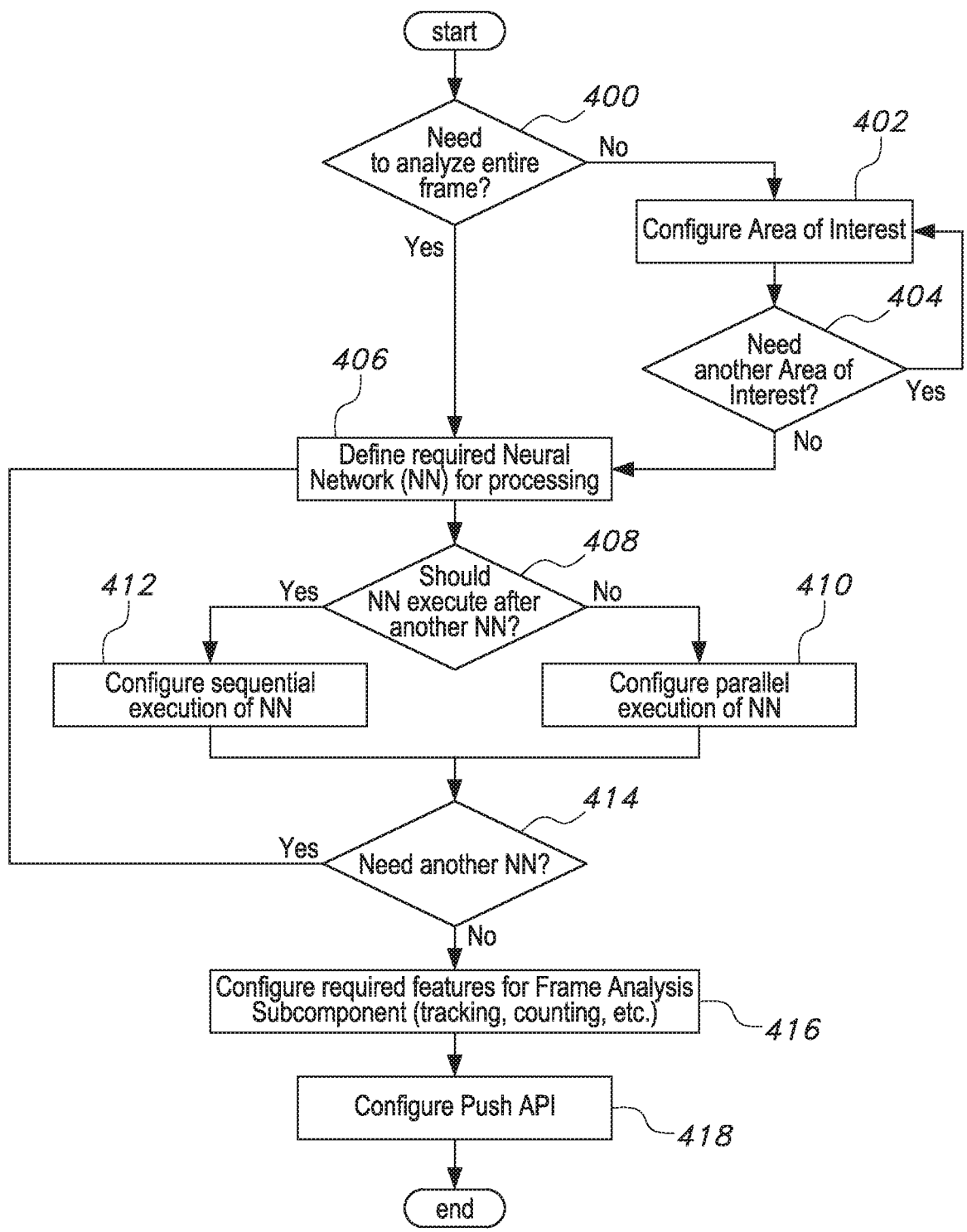
FIG. 4 shows a flowchart of a process embodiment performed by a video stream analysis configuration component of the real-time video stream analysis system.

The analysis configuration component 107 accompanies the video stream registration/configuration component 102 in the task of providing analysis information regarding video streams for the system. A flowchart of an embodiment of a process performed by the analysis configuration component 107 is shown in FIG. 4 and described as follows.

Figure 5:
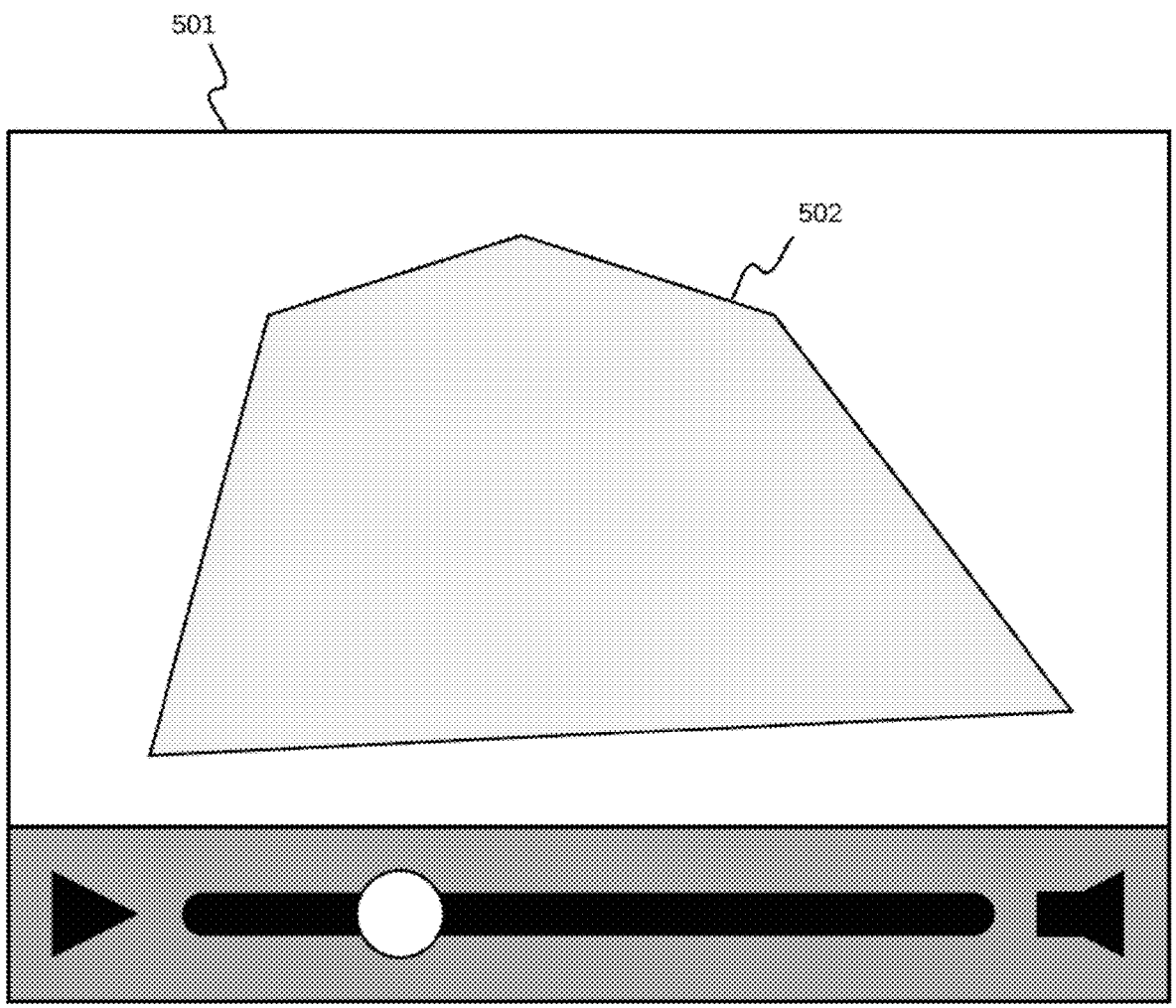
FIG. 5 shows an area-of-interest as determined for a video stream being analyzed.

IP cameras, as a specific type of video streaming device 100, are typically installed in a static manner and have a specific field of view (FOV). A customer is not necessarily interested in analyzing the entire FOV. For example, if the IP camera is a street-view camera and the IP camera is primarily aimed towards a road, the IP camera could also have partial or complete view of sidewalks with people. If the customer is only interested in applying video stream analysis to vehicles on that road, the FOV is restricted to one or more particular regions. With this goal in mind, the analysis configuration component 107 provides an ability to configure areas of interest. The result of this process is shown in FIG. 5 as polygon 502 over an imagable video mock 501, which is generated using coordinates of each of the polygon edges specified by the customer. As a result, the system includes one or more areas of interest configured for each video stream. In cases in which no area of interest is specified, the system processes and analyzes the entire visible area in the video stream.

Figure 6:
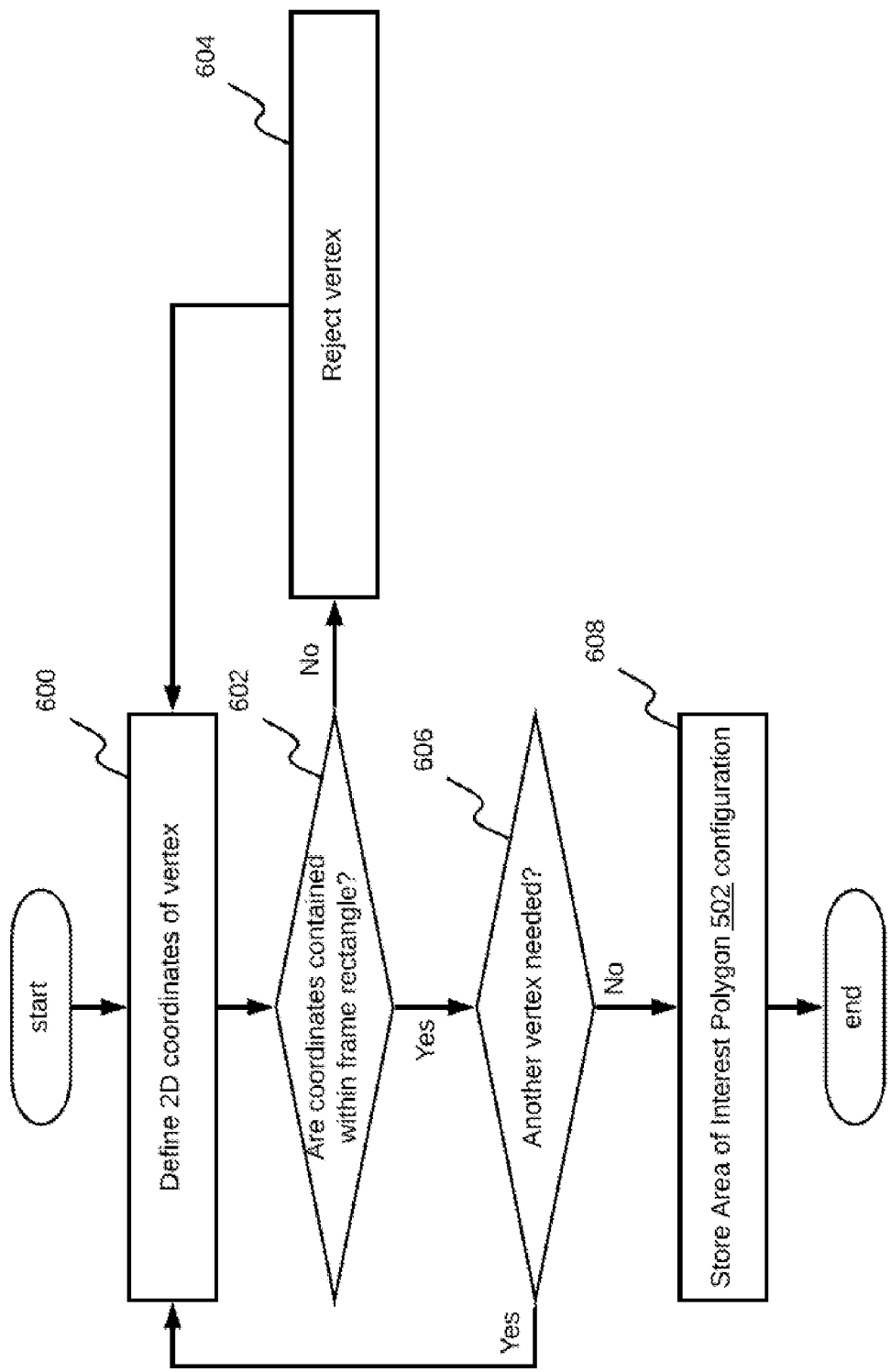
FIG. 6 shows a flowchart of a process embodiment performed by an area-of-interest configuration component of the real-time video stream analysis system.

FIG. 6 illustrates a flowchart showing an embodiment of a process performed by the system to configure a single area of interest 502. The system requests two-dimensional (2D) coordinates (x, y) of a first vertex of the polygon 502 in step 600. These coordinates lie inside the area of the video frame 501, that is, the coordinate x of the vertex is 0<=x<frame_width, and the coordinate y of vertex is 0<=y<frame_height, which is determined in step 602. If this is not the case, then the vertex is rejected in step 604 and the process returns to step 600. One technique to avoid such a restriction is to accept coordinates as relative or normalized values, for example, 0<=x<1 and 0<=y<1. Here, 1 corresponds to 100% of the width or height, respectively. With this transformation, coordinates will remain correct relative to any size of the video frame as long as the proportion of the sides remain the same. Such a method is advantageous for implementation of the system that resizes incoming video frames with optimization goals For example, if the incoming video frame size is 4096×2160, but the object of interest is large enough for the neural network to process the object of interest, that is, perform detection or classification tasks regarding the object of interest, even if the incoming video frame size was smaller, in order to save computational or networking resources, the system can be configured to resize incoming video frames to a reduced resolution, such as 1280×720. This feature greatly optimizes the use of processing resources while not affecting processing quality. This feature provides motivation for the relative configuration of coordinates, as the actual size of video frames can be reconfigured during the lifetime of video processing. For cases in which the specified 2D coordinates of a vector are not contained within acceptable ranges, the system rejects these coordinates and prompts the user to enter appropriate vertex coordinates. As soon as the restrictions are met, as determined by step 606, coordinates of the vertex are persisted in memory and the process returns to step 600 until all vertices of the area of interest polygon 502 are configured. When all vertices are specified, the system stores configuration information associated with the polygon in step 608.

In addition to the area of interest 502 configuration, the system also requires configuration regarding the selection of neural networks from a list of available neural networks that the system should use when processing frames of the video streams. The primary reason for such a configuration is that the system can support an unlimited number of neural networks that provide an extensible and rich set of video frame analysis. However, each execution of a neural network requires computational resources and time, which makes parallel execution of all neural networks on all registered video streams wasteful. In order to limit the number of such executions, the system configures those neural networks that are to be used on each video stream.

The present disclosure does not restrict or dictate the types of these configurations in each of the embodiments since there are numerous ways of arranging neural networks. For example, these configurations may specify a list of one or more identifiers, each of which is associated with a specific neural networks, for each video stream. The analysis configuration component 107 provides multiple ways for entering configurations, such as manually by the customer or system engineer using the Web GUI, or automatically using the API. As shown in FIG. 4, the analysis configuration component 107 arranges the registration of neural networks in sequences or serially with the configuration of parallel execution of the neural networks. In order to do this, the analysis configuration component 107 prompts the customer to continue specifying neural networks until a complete chain of processing neural networks 1606 is completed. This process is then iterated for other processing chains.

The determination of whether or not to analyze an entire frame is made in step 400. If not, then the area of interest in configured in step 402, and whether another area of interest is needed is determined in step 404. If another area of interest is needed, the process returns to step 402 and, if not, the process proceeds to define the neural networks to be used in step 406, which is also performed if there is a need to analyze an entire frame as determined in step 400. Whether a particular neural network is to be executed after another neural network is determined in step 408. If not, the parallel execution of neural networks is configured in step 410 and, if so, the sequential execution of neural networks is configured in step 412. Following these steps, whether another neural network is required is determined in step 414 and, if so, the process returns to step 406. If not, the process proceeds to configure features associated with the frame analysis component in step 416, after which the push API is configured in step 418.

Another responsibility of the analysis configuration component 107 is the specification of high-level features that the video stream processing is to perform. These features include, for example, object tracking, unique identification, contextual data merging, and the like. The features to be enable are implementation specific. The selection of features to be configured is based on the intended use of the neural network results. For example, object tracking cannot work without proper detection and thus, if such a feature is enabled, object detection from a configured neural network would be used by the system as input to object tracking algorithms. Configured features are persisted to the analysis results data storage 109 and are later heavily used by the frame analysis subcomponent of the video stream reading component 105 together with the analysis results processing component 110.

Figure 7:
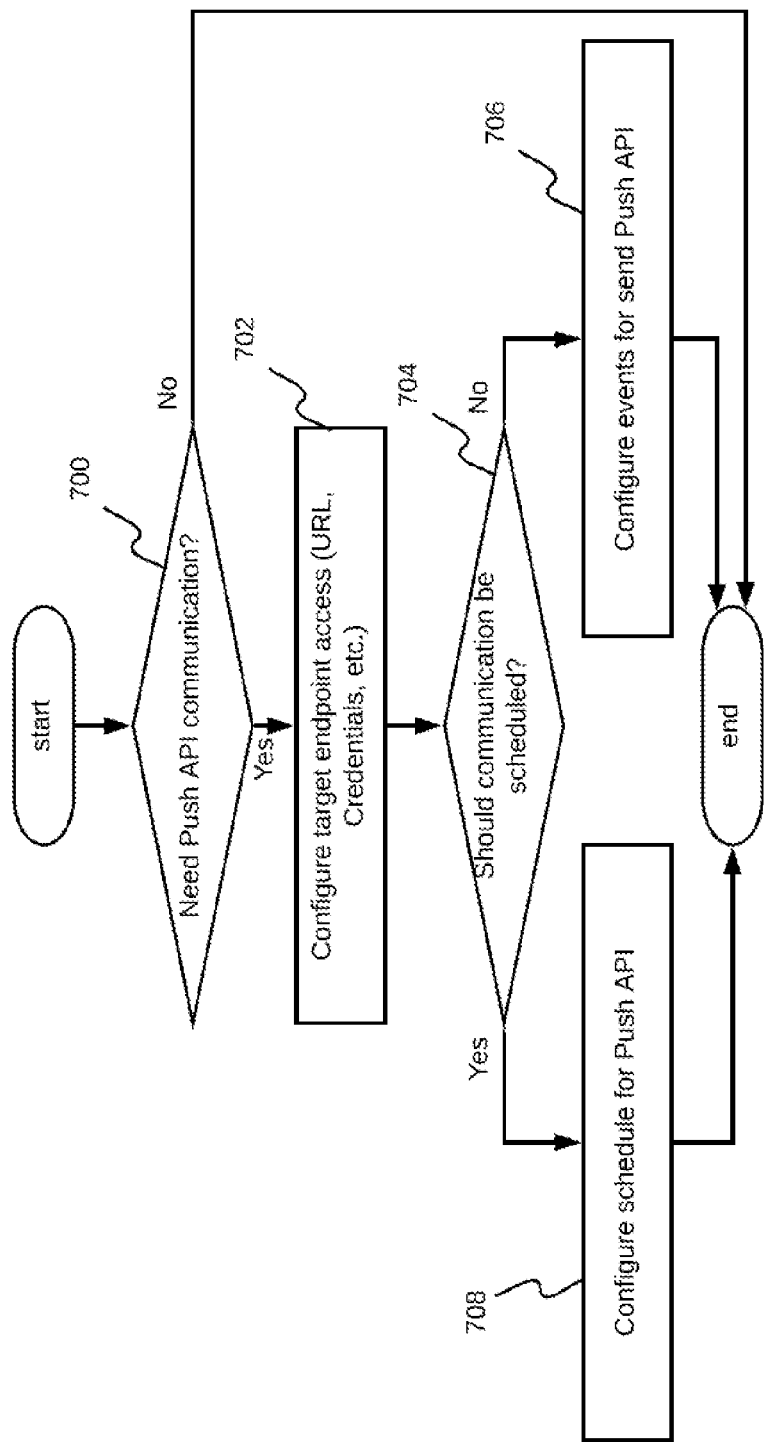
FIG. 7 shows a flowchart of a process embodiment performed by a push application programming interface (API) configuration component as a separate step of the video stream analysis configuration component of the real-time video stream analysis system.

In addition to the configuration features described above, the analysis configuration component 107 provides configuration of push API specifics for the system-to-customer communication of results from video stream processing. This process is shown on FIG. 7. Initially, a determination of whether the push API is to be used is made in step 700 and, if not, the process ends. If so, the process continues to configure target endpoint access in step 702. The analysis configuration component 107 expects access information regarding the target endpoint, which is typically on the customer's side. This can be a URL with credentials or any other method of communicating this information to the system. An aspect of the push API to be configured is whether the push API is to be scheduled by time or by a specific event. If the push API is scheduled by time, time intervals or particular time-of-day moments are configured in step 708. For example, specific time intervals can include every hour, every 15 minutes, every 4 hours, and/or the like. Examples of particular time-of-day moments can include at 4 pm, at 4 pm and 5 pm, and/or the like. One purpose of these settings is to provide customers with video stream analysis results in accordance with a customer's specification regarding this information. Configuration for specific events is useful for notification-type push API. Such API can be configured to make a call to a customer API endpoint whenever an event that the customer is interested in occurs, such as when a particular object type is detected in the video stream, a particular object is present in the video scene for longer than N seconds, an object with specific attributes is detected by a configured neural networks in the FOV, and/or the like. These events are or may be implementation-specific and configured in step 706. The entered configurations are persisted when saved by the analysis configuration component 107 to the configuration data storage 103.

The above described components provide input configurations for the system. As discussed, configuration is persisted into the configuration data storage 103. Although database implementations are not specified, since the system is designed for cloud-based execution, cloud-based database engines may be used in implementations of the disclosed embodiments.

Figure 8:
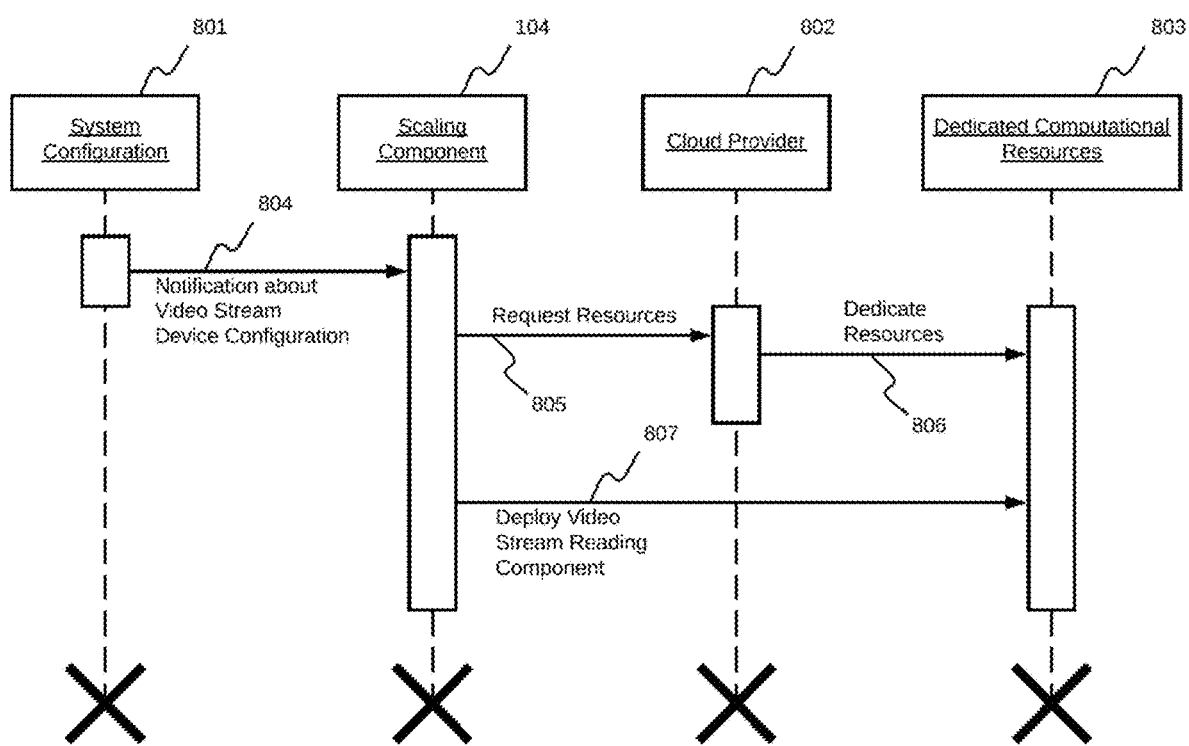
FIG. 8 shows a relational flowchart of a process embodiment performed by a scaling system up component of the real-time video stream analysis system that supports processing of a new configured video streams.

FIG. 8 is a relational flowchart of an embodiment of a scaling up process performed by the scaling component 104. In response to the system 801 providing configuration information associated with the video streaming device 100 in step 804, the scaling component 104 requests resources from a cloud provider 802 using a cloud provider API in step 805, and deploys the video stream reading component 105 in step 807 to use the requested resources 803 and connect to the video streaming device 100 in step 806. Requesting computational resources 803 from the cloud provider 802 is performed regardless of the actual provider chosen. A similar principle applies to deployment of the video stream reading component 105, which the scaling component 104 performs when required resources are deployed by the cloud provider 802. There are many ways of performing this deployment process, such as, but not limited to, using docker images deployment and, due to this fact, the selection of actual deployment mechanism implementations is not restricted herein.

Figure 9:
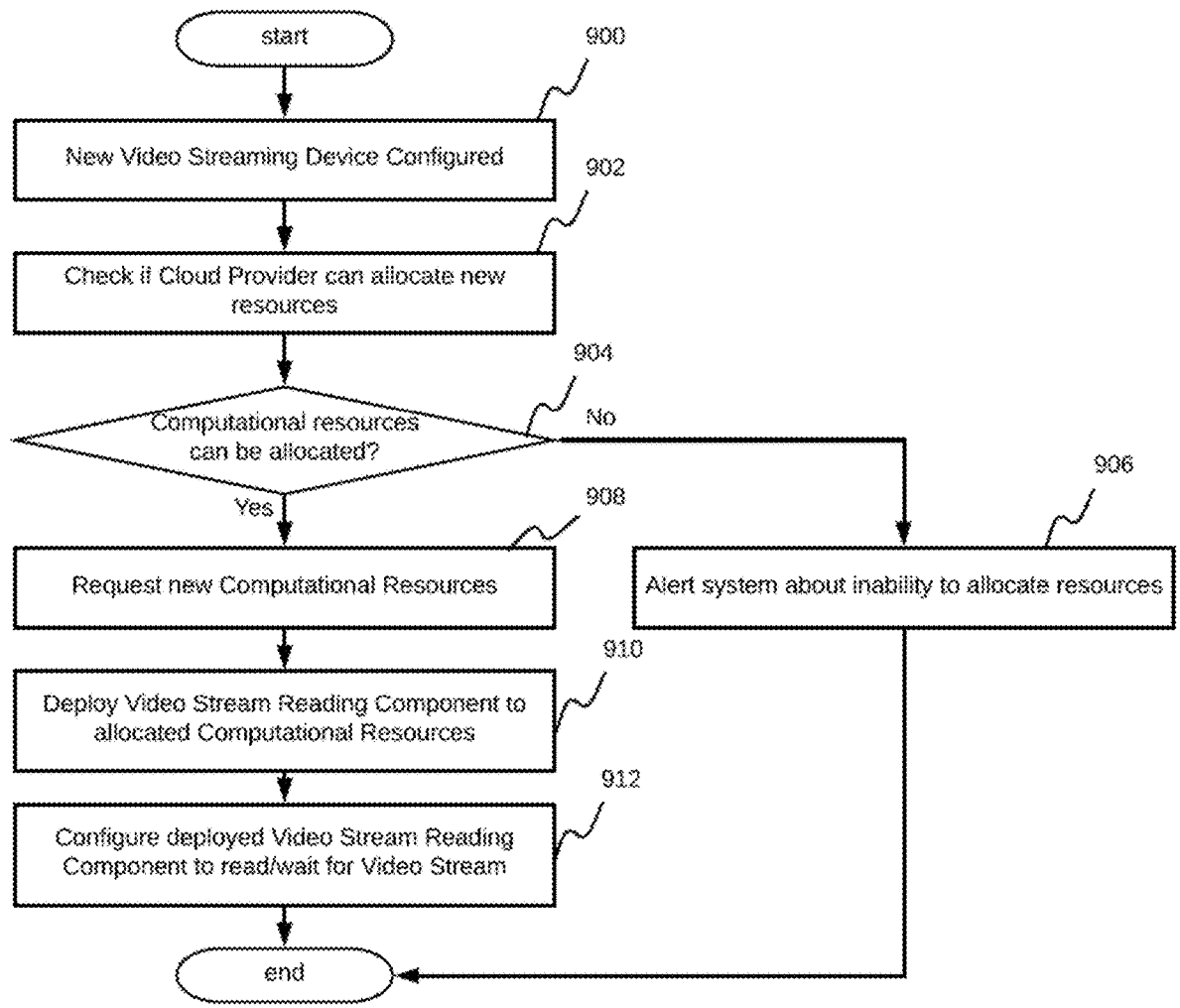
FIG. 9 shows a flowchart of a process embodiment performed by the scaling system up component that supports processing of a new configured video streams.

FIG. 9 is a flowchart of an embodiment of a scaling up process. The flowchart demonstrates that after the video streaming device 100 is configured in step 900 and before allocating new resources by the cloud provider 802, the system checks if the cloud provider 802 has resources to allocate in steps 902 and 904. Cases when this is not possible are handled gracefully by alerting the system, and potentially the customer, that there is no additional capacity to process the video stream at the moment, and another attempt should be made in the future in step 906. Such a feature allows for improved feedback and customer experience.

In addition, FIG. 9 demonstrates that after its deployment, the video stream reading component 105 is configured by the system to allocate computation resources in steps 908 and 910, which depends on how the video stream access component was previously configured. If communication with the video streaming device 100 is intended to be initiated by the server, then information regarding the VPN and device URL is passed as configuration information to the video stream reading component 105, which enables the video stream reading component 105 to initiate the connection and video stream processing. In cases where the video stream reading component 105 is intended to wait for the video streaming device 100 to initialize the connection, the video stream reading component 105 is prepared to start and wait for the incoming connection in step 912, which can also mean not only starting the server in wait mode, but also configuring networking of the infrastructure to be able to route the incoming connection from the video streaming device 100 to the deployed component. With the steps described above, the system performs scaling up, and is thus capable of serving an increasing number of registered video streaming devices 100.

Figure 10:
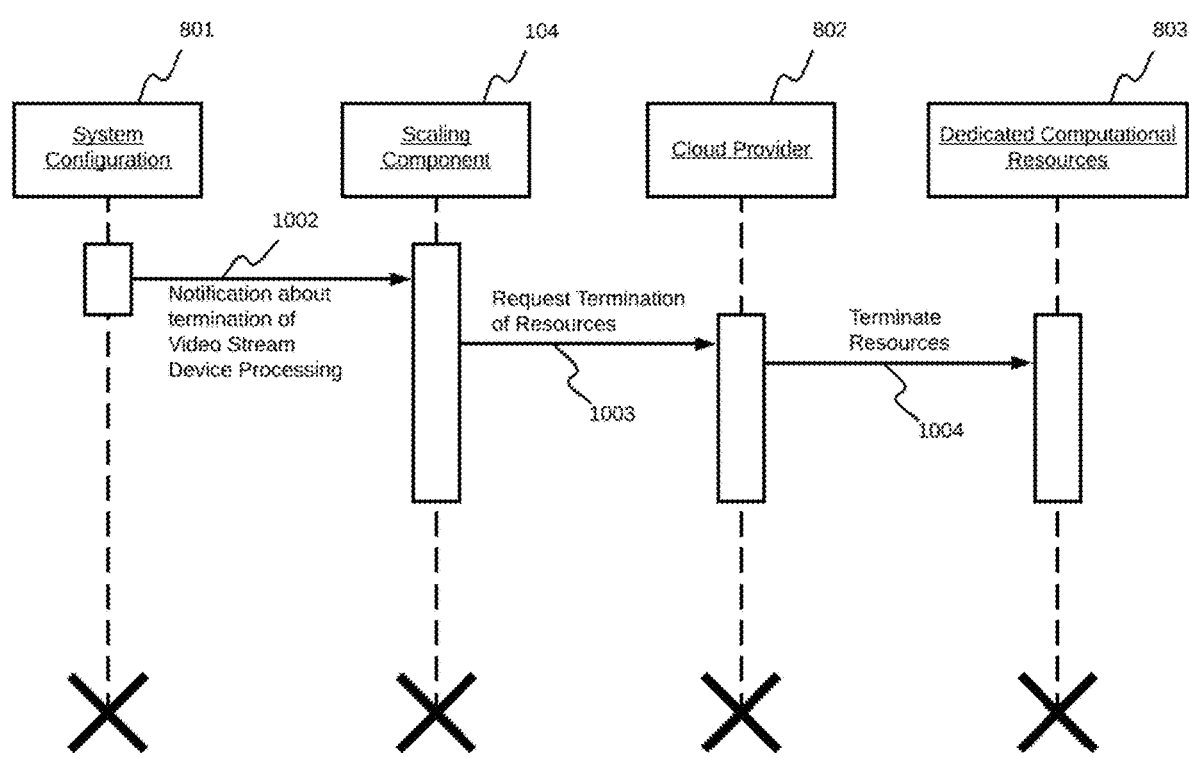
FIG. 10 shows a flowchart of a process embodiment performed by a scaling system down component of the real-time video stream analysis system that releases resources not required for processing video streams.

FIG. 10 is a relational flowchart of an embodiment of the scaling down process associated with the system. In response to the system receiving an instruction to stop processing a specific video streaming device in step 1002, the scaling component 104 requests the cloud provider 802, using its API, to free and collect computing resources that were dedicated to processing the video stream device 100 in step 1003. The cloud provider then terminates the current use these resources in step 1004. In this way, the system achieves scaling down in order to limit consumption of computational resources to only that which may be required at any given time.

Figure 11:
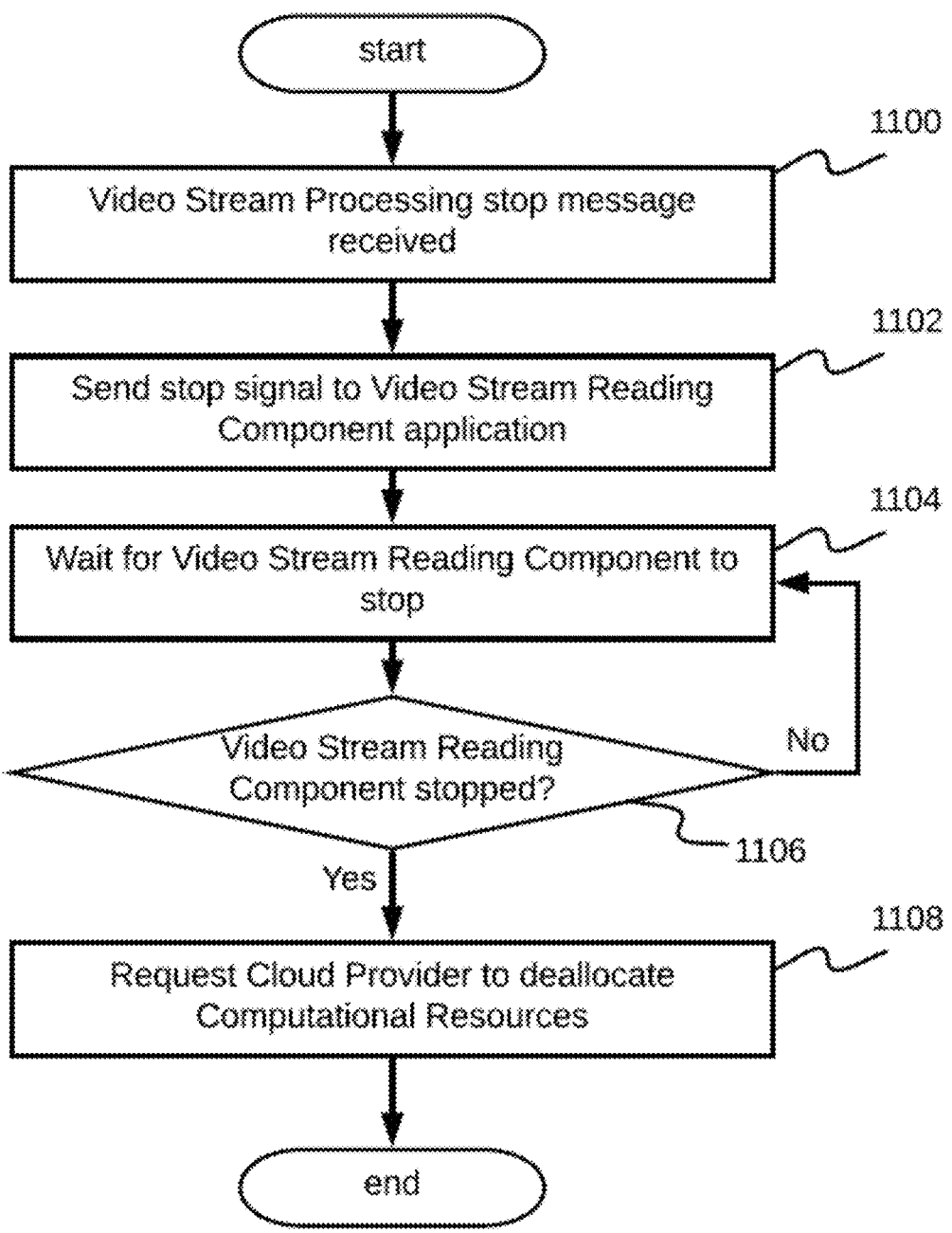
FIG. 11 shows a flowchart of a process embodiment performed by the scaling system down component of the real-time video stream analysis system that releases resources not required for processing video streams.

As shown in FIG. 11, which shows a flowchart for an embodiment of scaling down, before making a request to the cloud provider 802 to deallocate a resource in step 1108, a video stream processing stop message is received in step 1100 and the system sends a shutdown signal to the video stream reading component 105 in step 1102, following which the system waits for the working video stream reading component 105 to gracefully shutdown in steps 1104 and 1106. The reason for such a signal is that the video stream reading component 105 includes a frame analysis subcomponent, features of which are described below. In general, the frame analysis subcomponent uses results provided by the neural networks to perform higher level analysis or insights, such as object counts and movement event creations. Due its nature, the frame analysis subcomponent can occupy predefined states in some embodiments, but can also be stateless. As a result, the system allows a given amount of time for the frame analysis subcomponent to appropriately handle shutdown such that no analysis or insights are lost, but are rather successfully processed or even persisted to the configuration data storage 103. The actual duration of the shutdown time is or may be implementation-specific. In some embodiments, a predefined or hard timeout duration is assigned to the shutdown process such that the system is not hung indefinitely due to the occurrence of an errors and/or malfunction.

Figure 12:
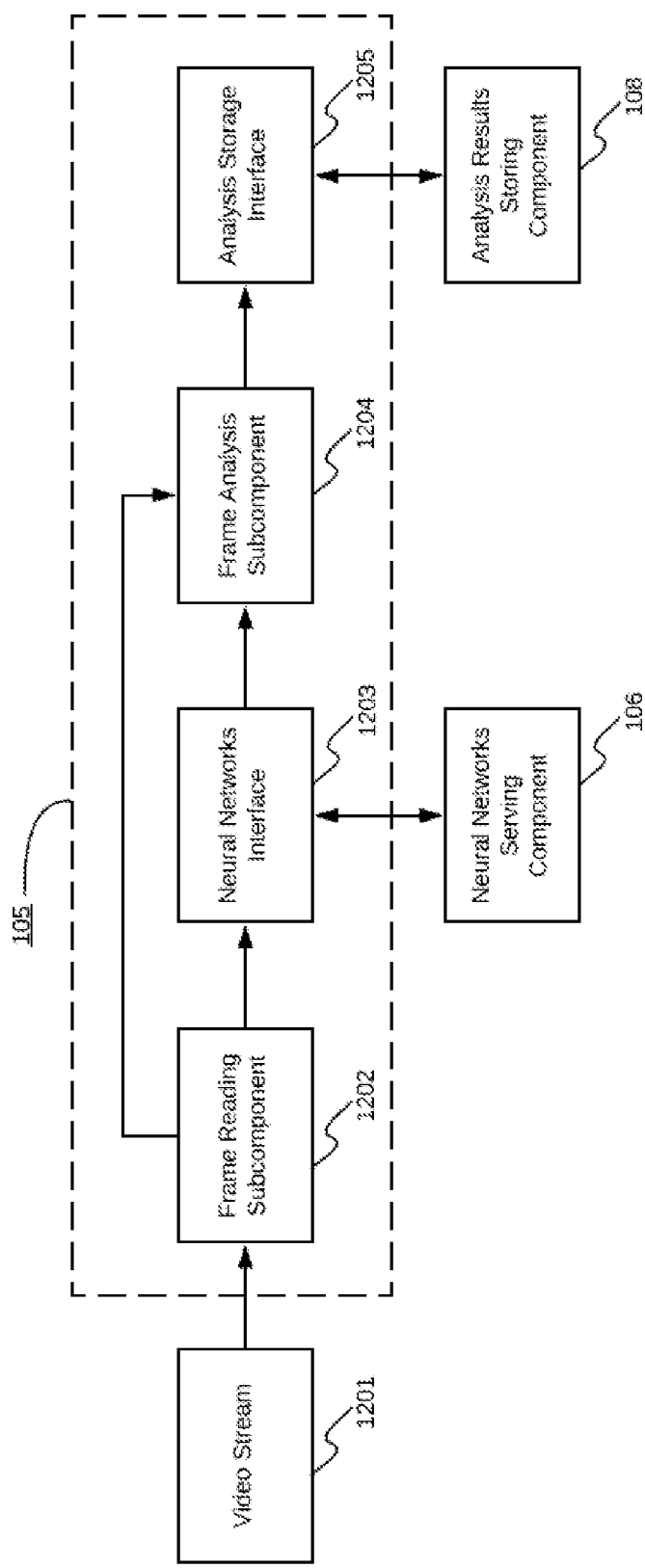
FIG. 12 shows a block diagram of an architectural embodiment of a video stream reading component of the real-time video stream analysis system.

FIG. 12 illustrates an embodiment of the architecture of the video stream reading component 105, which includes the frames reading subcomponent 1202, neural networks interface 1203, frame analysis subcomponent 1204, and analysis storage interface 1205.

The video stream reading component 105 processes the video stream 1201 from the video streaming device, takes individual frames from the video streaming device, sends individual frames to the neural networks serving component 106, processes frames with the neural networks analysis results, and sends processing results to the analysis results storing component 108.

Figure 13:
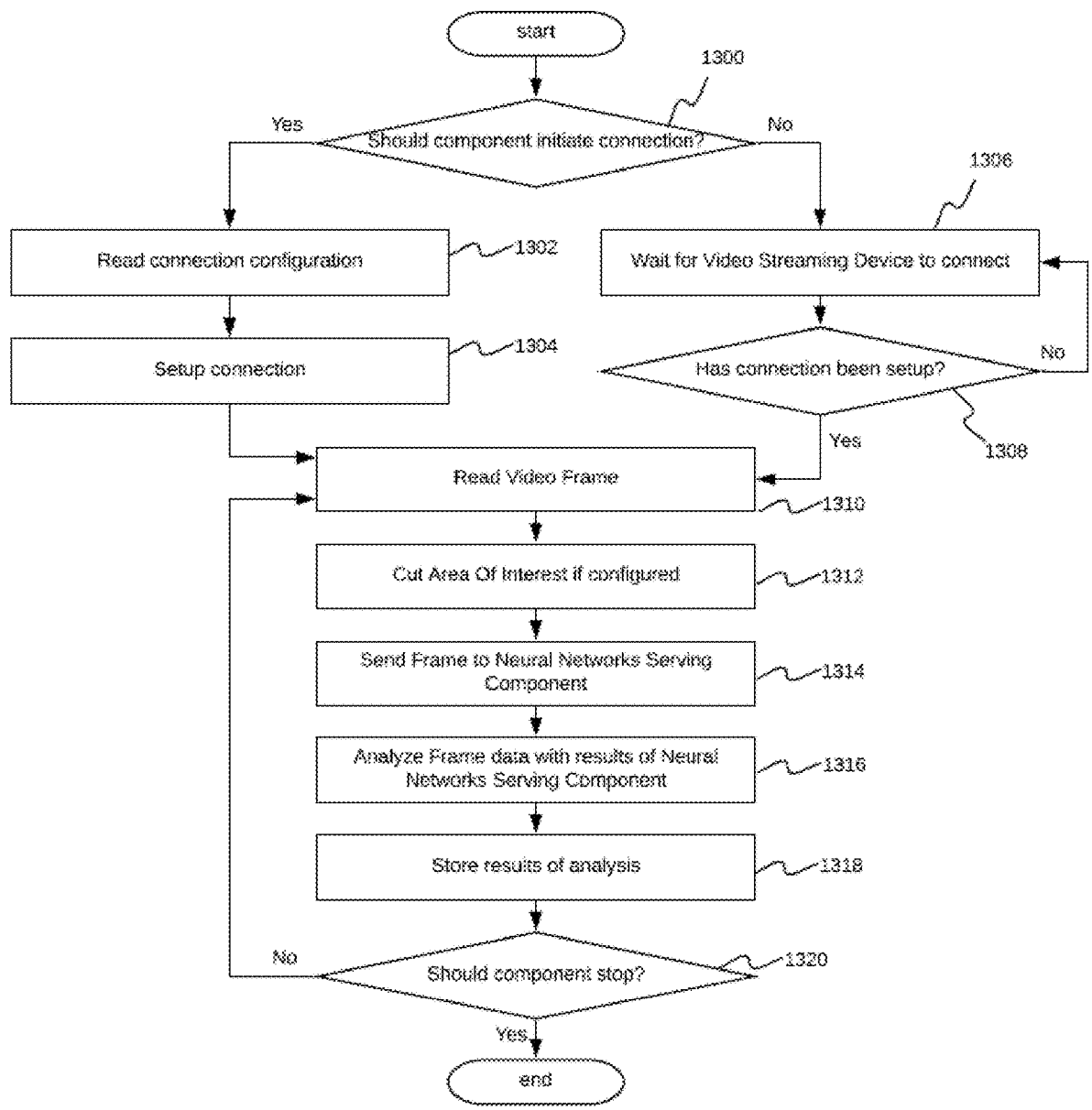
FIG. 13 shows a flowchart of a process embodiment performed by the video stream reading component of the real-time video stream analysis system.

FIG. 13 is a flowchart of a process embodiment performed by the video stream reading component 105. The video streaming device 100 is connected in order to start receiving video frames from the video stream. The actual process depends on the type of access configured during deployment of the video stream reading component 105. If the server initiates the connection in step 1300, then the video stream reading component 105 reads the provided access configuration in step 1302 and configures the connection in step 1304. This step involves setting up a VPN connection, if required, and thereafter making a connection to the video streaming device 100, which typically uses an RTSP URL. After the connection is configured, the video stream reading component 105 is able to start reading the video stream frame by frame. If the server is configured to wait for the video streaming device 100 to initialize the connection, then the server waits until the connection is configured in steps 1306 and 1308. Thereafter, the server starts processing the video stream frame by frame.

Following access to the video frames being configured, the video stream reading component 105 enters a loop that processes each individual frame in accordance with a schema, which includes reading the video frame in step 1310, defining the configured area of interest 502 from the video frame in step 1312, sending the video frame 1314 to the neural networks serving component 106 in step 1314, receiving results from the neural networks, processing, and analyzing the video frames using these results in step 1316, and storing the results of the analysis in step 1318. This loop is repeated until either the video stream terminates or the video stream reading component 105 is instructed to shut down in step 1320. These steps are described in additional detail below.

The video stream 1201 provided by the video streaming device 100 represents an ordered collection of frames. Each frame is a two-dimensional array of pixels and each pixel has an intensity, which is a number specifying an amount of grey color for white-black video frames and an amount of red/green/blue colors, respectively, for colored video frames. The frame reading subcomponent 1202 collects video frames 1603 from the incoming video stream, which can be performed using various video-processing open libraries. However, the frame reading subcomponent 1202 is N-dimensional, in which a value of N depends on a color mode of the frame, wherein the pixel arrays represent frames as output. It is to be noted that in order to support the areas of interest described above, the frame reading subcomponent 1202 modifies frames that it reads by making all pixels outside one or more area of interest polygons to have a zero value, which effectively represents these areas in a black color. The following code snippet, which is implemented in Python, helps to understand how at least one embodiment of this feature is implemented.

```
import numpy as np
# have actual frame data
frame: np.ndarray=[ ]
# masks of areas of interest polygons
# has 1 where area of interest is present
mask: np.ndarray=[ ]
frame_with_areas_of_interests_only:
    np.ndarray=np.zeros(frame.shape) idx=(mask==1)
# copy only pixels that are covered with areas of interest
    frame_with_areas_of_interests_only[idx]=frame[idx]
```

Figure 14:
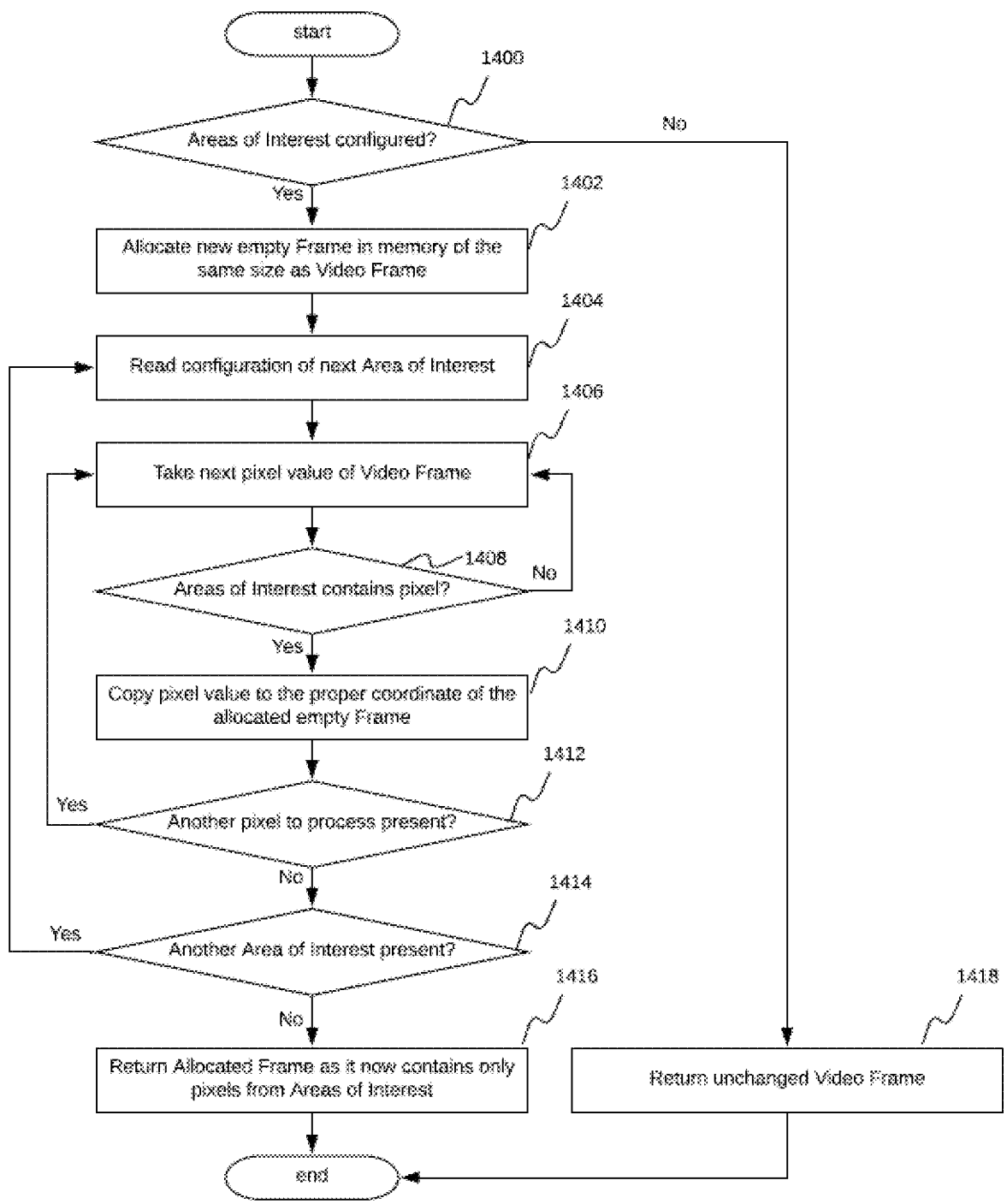
FIG. 14 shows a flowchart of a process embodiment performed by a cutting area-of-interest component of the real-time video stream analysis system.

FIG. 14 accompanies the code snippet from above and shows a flowchart of one embodiment of a process that cuts multiple configured areas of interest (AOI) 502. First, the process determines if any areas of interest are configured in step 1400 and, if not, the video frame 1603 is returned as is and is not modified in step 1402. In cases where at least one AOI 502 is configured to be used, an empty frame in memory that is the same size as the video frame is allocated in step 1402. Then, the process starts looping over one of more AOIs by reading configurations or descriptions of each individual configured AOI 502 in step 1404. These descriptions include a collection of 2D coordinates of vertices of the AOI 502 polygon having values that are either absolute or relative with respect to the video frame value. Inside this loop, the AOIs 502 start another loop for each pixel of the incoming video frame 1603 at step 1406. During each iteration of this loop, pixel coordinates are checked to determine if the coordinates are contained within or lie on the border of the AOI 502 polygon in step 1408. If this determination is true, the pixel value is copied as is to the pre-allocated empty video frame buffer, which has the same size as the incoming video frame 1603 in step 1410. If this determination is false, then no action is performed and the loop determines if there are more pixels to process in step 1412. If so, the process continues to process the next pixel of the video frame 1603 in step 1406 and, if not, the process determines if there are more AOIs present in step 1414. If so, the process returns to step 1404 and, if not, the process proceeds to return the allocated frame with pixels that are from the AOIs in step 1416. Thus, after all iterations of both loops (over pixels and over AOIs 502) are completed, the allocated, initially empty, video frame holds only pixel values for all configured AOIs 502 in step 1416, which completes the algorithm. Using the above method, video frames 1603 contain only portions of the image that are configured inside areas of interest. These frames are forwarded to the neural networks interface 1203 as follows.

Figure 15:
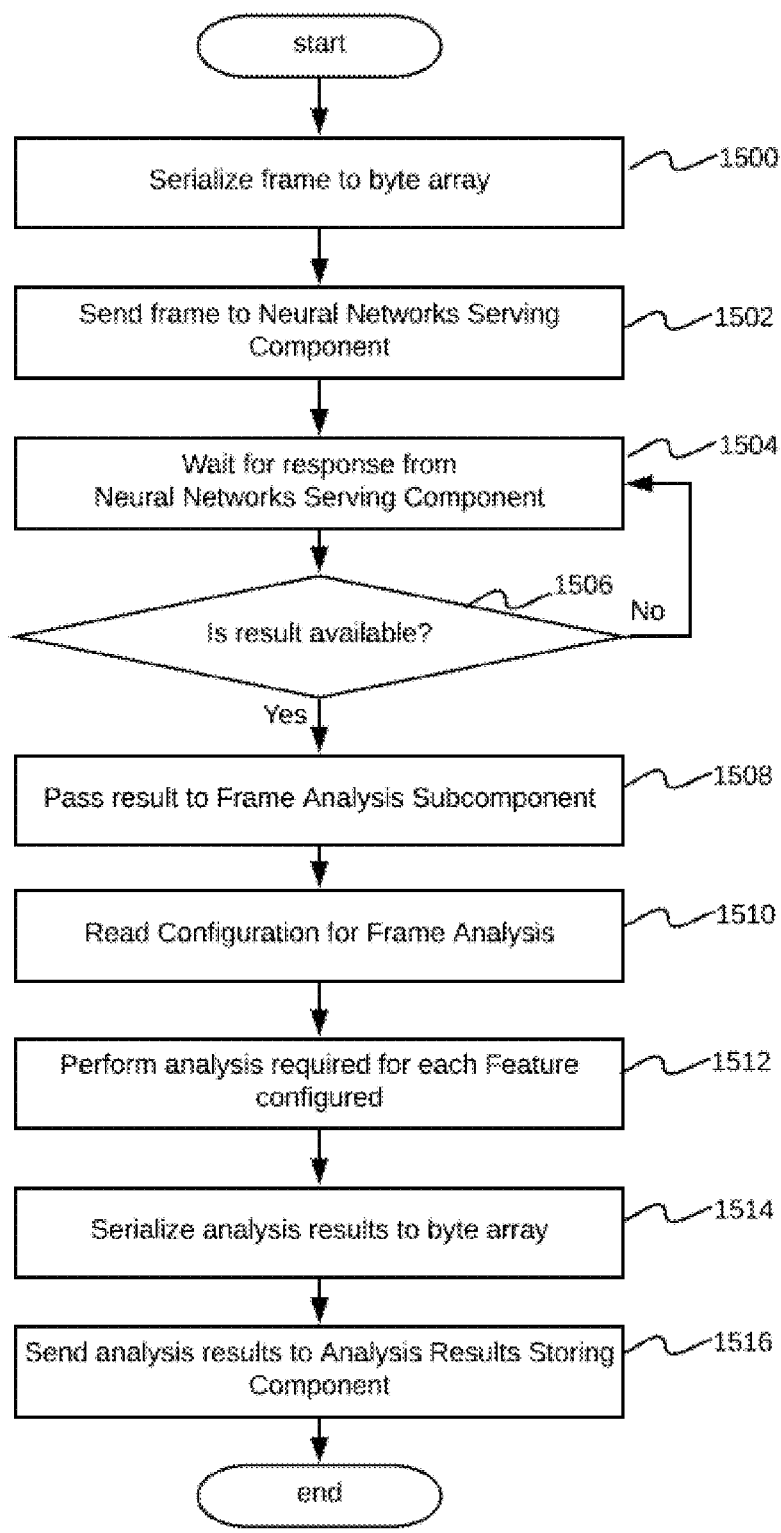
FIG. 15 shows a flowchart of an incoming video frame processing embodiment performed by a video stream reading component of the real-time video stream analysis system.

FIG. 15 shows an operational flowchart of an embodiment of the neural networks interface 1203, frame analysis subcomponent 1204 and analysis storage interface 1205. The neural networks interface 1203 is a subcomponent that sends frames received from the frame reading subcomponent 1202 to the neural network serving component 106 in step 1502, and forwards results from the neural network serving component 106, following a wait time in step 1504 and a determination of whether the result is available in step 1506, to the frame analysis subcomponent 1204 in step 1508. Sending frames to the neural network serving component 106 and receiving analysis results is performed over the network and includes serializing video frames for network transfer that effectively includes serializing pixel arrays to byte arrays in step 1500, which depends on the API format of the neural network serving component 106. For example, this could be performed using hypertext transfer protocol representational state transfer application programming interface (HTTP REST API), Google® remote procedure call application programming interface (GRPC API), Apache® Thrift API, and/or the like. The choice of actual format is or may be implementation-specific.

The frame analysis subcomponent 1204 is an optional subcomponent that can be used to process frame sequences in step 1510 (e.g., to perform object tracking, object direction tracking, and/or other complex tasks that require one or more ordered sequences of frames) and/or to combine such processing with analysis results from the neural networks 1606 (e.g., if the neural networks that are used perform the detection of vehicles, then this information may be used to perform a vehicle tracking task). Since actual implementations can use the frame analysis subcomponent 1204 for numerous tasks of the above-described types, the present disclosure describes this component as a specific placeholder in which such capability can be located. One task that is common for at least some of the embodiments is the step of reading the analysis configuration from the configuration data storage 103 so that the frame analysis subcomponent 1204 performs only that analysis specified by the customer and/or system.

Results are passed, in step 1508, to the frame analysis subcomponent 1204, which reads the configuration for frame analysis in step 1510, processes frames for each configured feature in step 1512, serializes analysis results to a byte array in step 1514, and provides final analysis results in step 1516. Alternatively, in cases in which the frame analysis subcomponent 1204 is omitted in embodiments of the disclosure and the raw neural network analysis results are available, results are persisted in the system in order to provide further access to these results and an ability to perform fine- or coarse-grained aggregation. The analysis storage interface 1205 subcomponent serves this purpose and forwards incoming analysis results to the analysis results storing component 108 in step 1516, which persists this information into a database.

Figure 16:
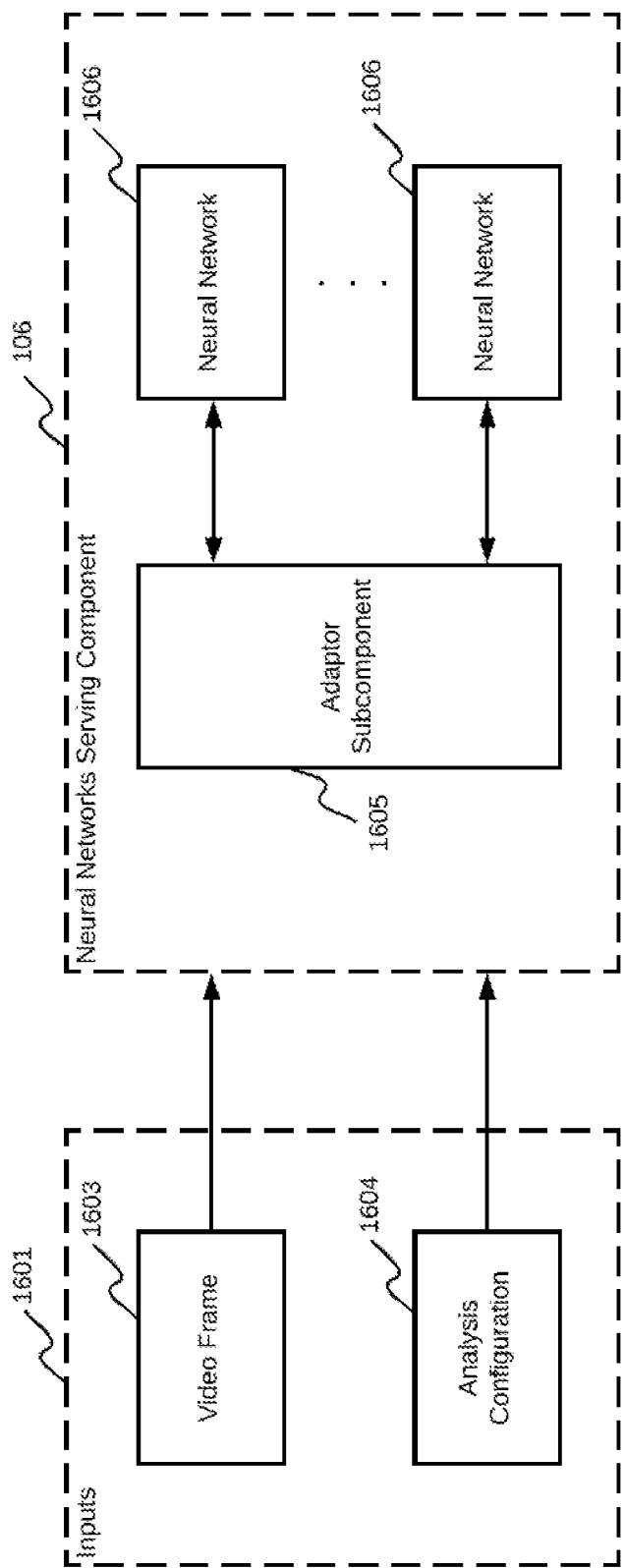
FIG. 16 shows a block diagram of an architectural embodiment of a neural networks serving component of the real-time video stream analysis system.

FIG. 16 illustrates an embodiment of an architecture for the neural networks serving component 106, which includes of a plurality of neural networks 1606 and an adaptor subcomponent 1605. Inputs 1601 for the neural networks serving component 106 include individual video frames 1603 from video streams and the analysis configuration 1604 for the video stream.

After receiving the input video frame 1603, the neural networks serving component 106 extracts specific neural networks 1606 to process the video frame from the analysis configuration and initiates parallel processing of the video frame by the required neural networks 1606. When the neural networks 1606 finish processing, the analysis results are sent as a response to the original request to the neural networks serving component 106, thus completing the frame processing. It is to be noted that, to provide detailed analysis results, not only is making parallel calls to the desired neural networks 1606 performed, but sequential calls are also arranged when a particular neural network 1606 can provide more details regarding the results returned by another neural network 1606. An example of this would be an emotion classification neural network 1606, which is capable of classifying emotions of facial images provided by another neural network 1606 that is capable of performing facial detection. In this case, the neural networks serving component 106 not only performs calls to multiple configured neural networks 1606, but is also capable of arranging the neural networks 1606 into one or more meaningful sequences to provide richer analysis results. Actual chains of such parallel and/or sequential calls are dependent on the actual neural networks 1606 available in the system, and are or may be implementation-specific.

Having the ability to execute multiple neural networks 1606 while processing the individual video frames is an important feature of the system. While a single neural network can be trained to perform object detection and classification for all object types required by actual implementations of the disclosed embodiments, it is substantially more common to have neural networks that are directed to one or a small number of object types. For example, if the neural network is trained to perform object detection and classification of person objects, it would likely be difficult to train that same neural network to perform object detection and classification of vehicle objects, or to recognize license plates. Thus, different neural networks are selected for different object types so that the selected neural networks can perform operations with greater accuracy, efficiency, and confidence. This is why processing each individual video frame with multiple neural networks is important, since this technique provides a technique for handling video frames that contain objects of different types by enabling each object type to be assigned to a dedicated configured neural network.

Figure 17:
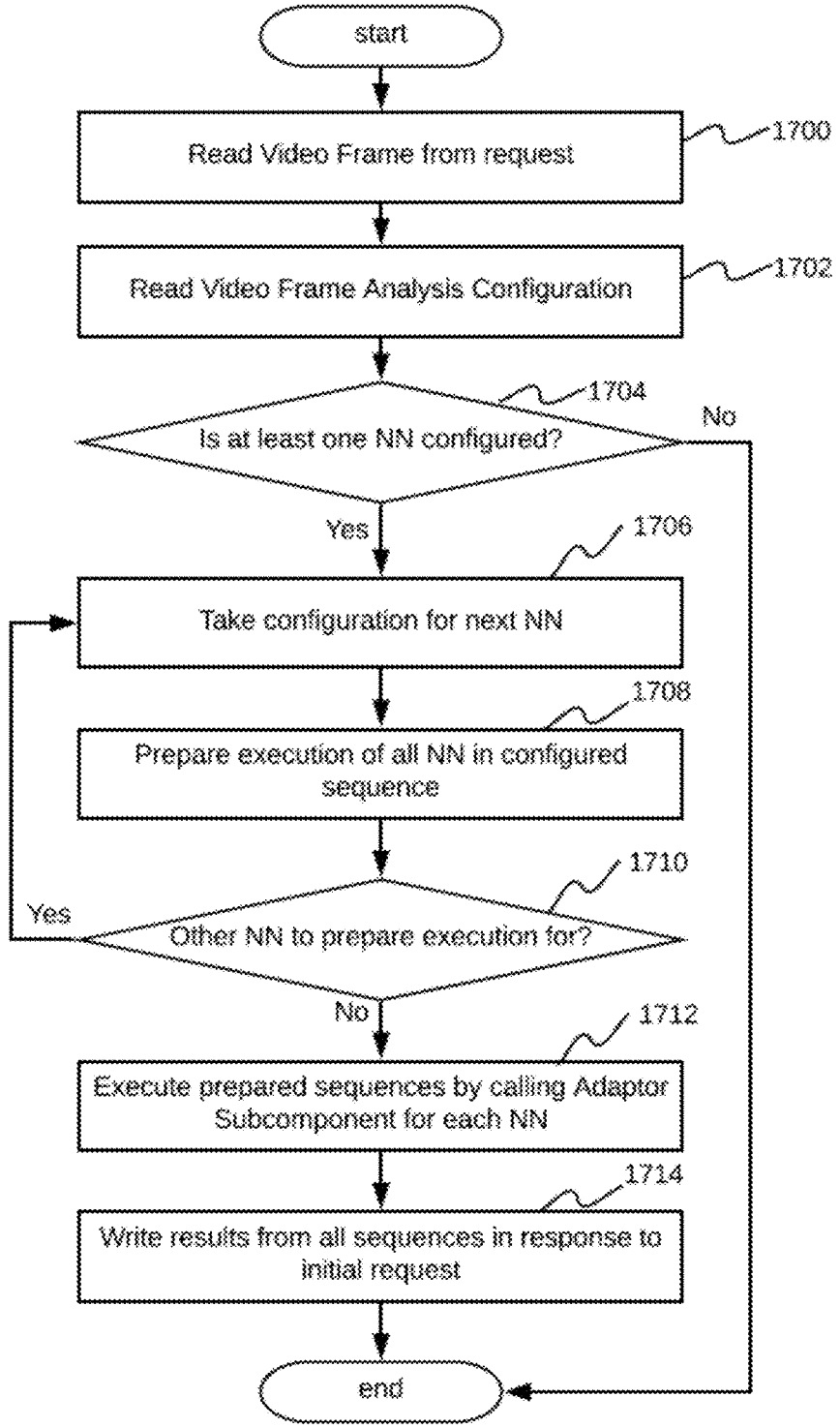
FIG. 17 shows a flowchart of an incoming video frame processing embodiment performed by a neural networks serving component of the real-time video stream analysis system.

FIG. 17 shows a flowchart of one embodiment of video frame processing by the neural networks serving component 106. The video frame 1603 is read from the incoming request in step 1700. At this stage, the video frame 1603 includes information from configured areas of interest, which enables the neural networks 1606 to be focused on the objects in the AOIs 502. After reading the analysis configuration from the configuration datastore in step 1702, the neural networks serving component 106 determines which neural networks 1606 are to be executed, and more specifically, which neural networks are to be executed in parallel, and which neural networks are to be executed sequentially, serially, or in chains. If no neural networks 1606 are determined to be configured in step 1704, the initial request is returned with no neural networks 1606 actually specified. If neural networks 1606 are determined to be configured in step 1704, then the neural networks serving component 106 performs iterations of a loop including steps 1706, 1708, and 1710 to read chains to be executed in parallel and, once all chains are ready to be executed, runs the chains through an adaptor subcomponent 1605 in step 1712. After receiving the results from all chains, the chains are written as a response to the initial request and the request processing is completed in step 1714.

It is to be noted, that while processing individual chains of neural networks 1606, a single call to the adaptor subcomponent 1605 is made for each neural network 1606 at any moment of time. A response from the adaptor subcomponent 1605 is received from the neural network 1606 once, and the results of the call are combined with the video frame 1603 data together with the next neural network 1606 to be executed and passed to the adaptor subcomponent 1605 to make another call in the chain. Then, the process repeats until all neural networks 1606 in the chain are executed.

Combining results from a single neural network 1606 call and video frame can mean many different things, as this is or may be dictated by the requirements of the next neural network 1606 in the chain. For example, in the case of facial classification, the call to the first neural network 1606 in the chain may return detected coordinates of all faces present. In order to classify each face using the next neural network 1606 in the chain, each face is cut from the original video frame and a new frame is created that includes only the extracted faces. Such a frame is then mapped to the next neural network 1606 for facial classification, and only after the next neural network 1606 can it be executed. Thus, the original video frame can proceed through numerous different transformations as a result of calls to the neural network 1606 in a single chain. Details regarding these transformations are or may be implementation-specific.

Open source tools enable implementation of neural networks 1606. Different frameworks, such as TensorFlow, Caffe, and the like provide different formats of interfaces and describe inputs and outputs of the neural networks 1606 differently. Thus, neural networks 1606 of the same structure that are implemented with different tools may have different APIs. In addition to variations caused by different tools used for their creation, neural networks 1606 can also vary in internal architecture, which makes for another type of variable between neural networks. Neural networks 1606 that have the same architecture and that are implemented with the same tools can be trained on different types of inputs or images. However, some of these neural networks may require black-white images, colored images, normalized images, images containing specific content, and/or specific content, such as content specific to facial recognition (e.g., some neural networks need images representing only the face while others require images of the entire head). With all of these differences between neural networks 1606 comes the need for a universal interface, which is provided by the adaptor subcomponent 1605. Given the input frame and a neural network 1606 to execute, the adaptor subcomponent 1605 is responsible for pre-processing the input frame, which includes resizing the image, changing color modes, normalization, and/or the like, and executing the neural network 1606 with pre-processed frame and reading output from the neural network 1606 in accordance with a specific output format of the particular neural network 1606.

Figure 18:
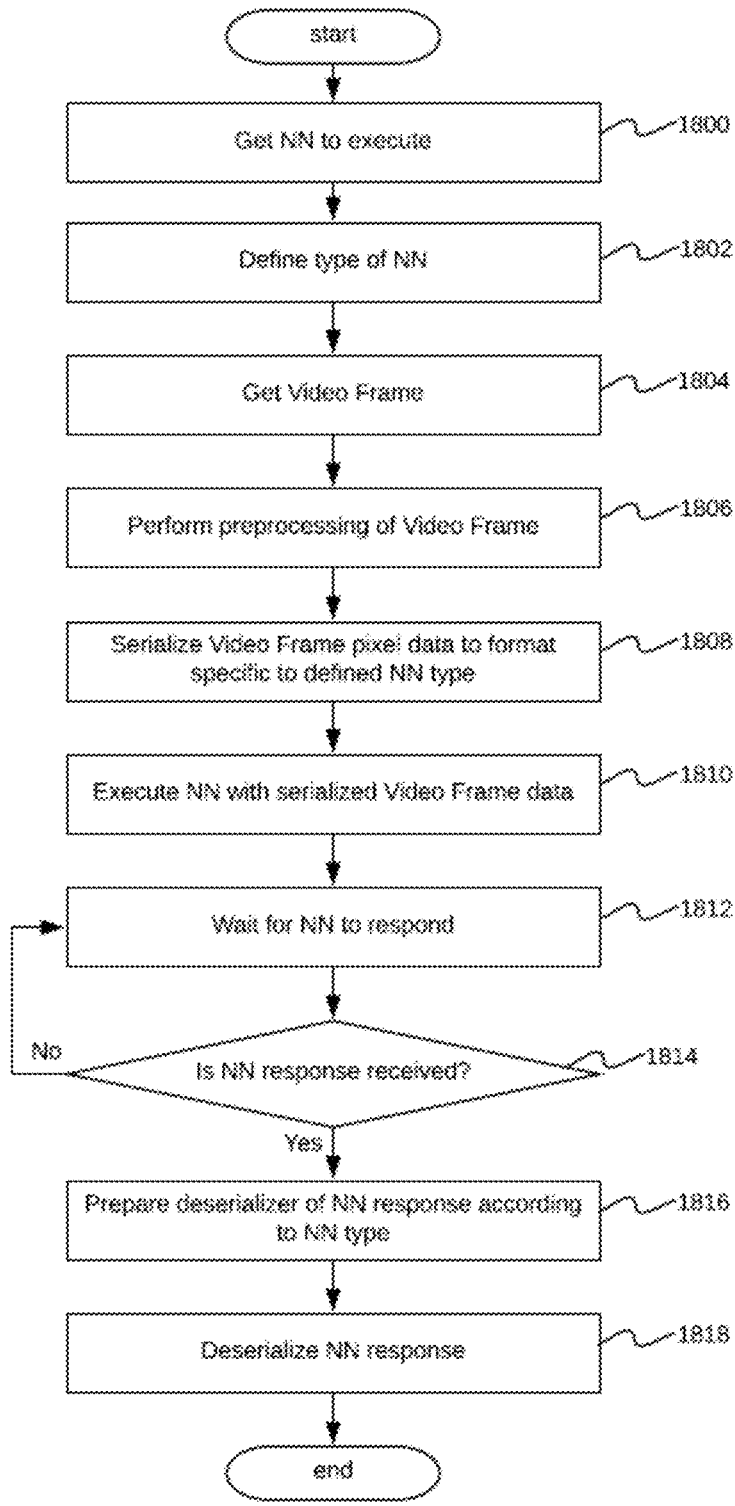
FIG. 18 shows a flowchart of a process embodiment performed by a neural network adaptor subcomponent of the real-time video stream analysis system.

FIG. 18 shows a flowchart of an embodiment of a process performed by the neural network adaptor subcomponent 1605. The neural network 1606 to be executed is obtained in step 1800, and the type of this neural network is defined in step 1802. This is an important step since, as discussed above, different types of neural networks define different APIs. The term type as used herein not only represents the technology used to create the neural network 1606, such as Tensorflow, Caffe, and/or the like, but also the type of inputs and outputs associated with the neural network 1606. Thus, the type of neural network defines how information is to be provided to the neural network 1606, and how this information is to be obtained from the neural network. For example, Tensorflow inputs can be defined as single tensor or multiple tensors, which applies to output tensors as well. The adaptor subcomponent 1605 knows the specifics of each individual neural network 1606 that the adaptor subcomponent 1605 is capable of working with. As discussed above, neural networks 1606 may use different types of image data preprocessing before this information is input to the neural network 1606. The adaptor subcomponent 1605 obtains the incoming video frame in step 1804, and applies these preprocessing manipulations to the incoming video frame 1603 in step 1806. If no preprocessing is used, the adaptor subcomponent 1605 is notified of this situation and omits step 1806.

Regardless of whether preprocessing is used or not, the adaptor subcomponent 1605 provides the video frame pixel data to the neural network 1606. This process is specific to each individual neural network 1606. Essentially however, the step includes serialization of the video frame pixel data to the input data format of the neural network 1606 in step 1808. After input data is provided to the neural network, the adaptor subcomponent 1605 causes execution of the neural network 1606. Once execution is started, the adaptor subcomponent 1605 begins waiting for a response from the neural network 1606 to be made available by performing a loop, which includes waiting for the response in step 1812 and determining if the response has been received in step 1814. A predefined period of time to wait in step 1812 is or may be implementation-specific. The response from the neural network 1606 is typically encoded in a specific manner. The next step performed by the adaptor subcomponent 1605 is to perform deserialization in accordance with the type of neural network 1606 that was executed in steps 1816 and 1818. The adaptor subcomponent is made aware of the deserialization process required by the particular neural network 606 before commencing the deserialization process. The output of the neural network 1606 is or may be implementation-specific. After the response from the neural network 1606 is read, video frame processing by the adaptor subcomponent is completed. There are many variations of how the adaptor subcomponent 1606 can works in actual implementations, which include various specific formats of neural networks 1606 and/or the APIs associated with the neural networks.

The neural networks 1606 as referred to herein can include image-processing neural networks such as, but not limited to, convolutional neural networks. Typically, image processing neural networks are trained to perform object detection and classification tasks. Object detection is performed by providing an image, such as a video stream frame, performing analysis and outputting relative coordinates of an object representing one of the object classes that the neural network was trained to recognize, such as a cat, dog, vehicle, license plate, person, face, and/or the like. Object classification is performed by providing an image representing a particular object, which the particular neural network was trained to classify, and outputting attributes and/or traits of the particular object that the neural network was trained to classify, such as the make, model, year, and/or color for vehicles, or the age, gender, and/or emotion for faces. Using a combination of these neural networks, the system makes it possible to arrange a process of performing both tasks in sequential order. First, object detection of the video stream frame is performed, and then each detected object is classified. The analysis result representing this information is then returned.

Figure 19:
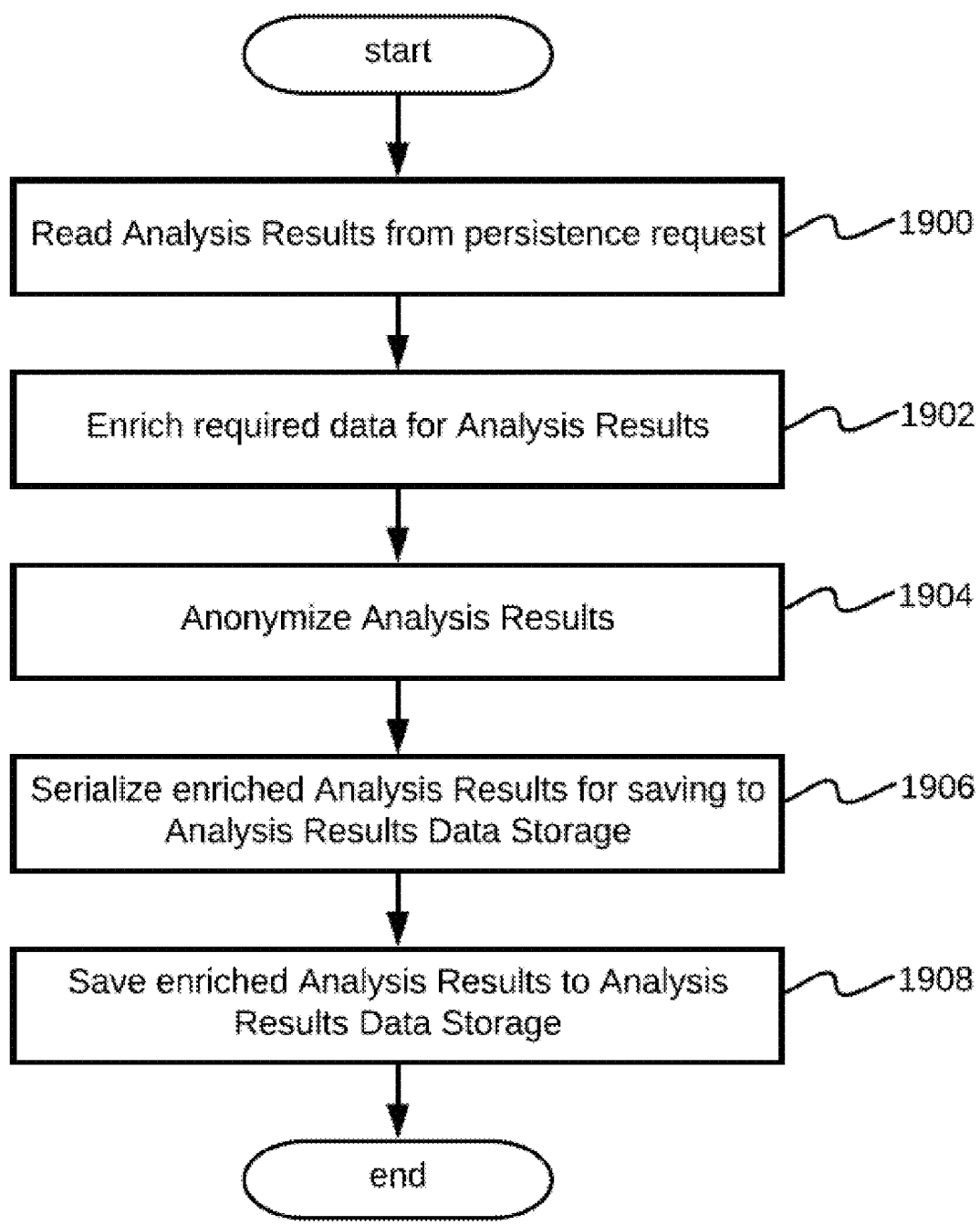
FIG. 19 shows a flowchart of a process embodiment performed by an analysis results storing component of the real-time video stream analysis system.

As shown in FIG. 19 the analysis storage interface 1205 of the video stream reading component 105 sends prepared analysis results to the analysis results storing component 108 in step 1908. One goal of this process is to forward incoming analysis results from the video stream reading component 105 to persistent storage, which is the analysis results data storage 109 that is implemented as a cloud-based database. The choice of actual cloud-based database engine is or may be implementation-specific, however, one of the functions that the analysis results storing component 108 performs is to handle logic of the API calls to the database, passing its analysis results, and specifying exactly how these analysis results should be stored. For example, the internal structure of the data storage, which includes the arrangement of analysis results in the database, can include any one or more of the following: per-timestamp—with each object and its trait that was detected by neural networks 1606 being mapped to the timestamp of the moment upon their occurrence; per-object—with a single database record containing all traits of a specific object; per-timestamp per-object per-trait—with a single database record storing each object's trait as a separate row in the database, and/or the like. The actual choice of the database structure is or may be implementation-specific and depends on the neural networks 1606 that are used and the end reporting capabilities that are to be provided. However, the general principle of the analysis results storing component 108 includes providing a service layer to store analysis results in a desired or required manner in the database, regardless of the actual needs of the system implementation details.

FIG. 19 summarizes all the steps of the analysis results storing component 108. First, the analysis results are stored in step 1900 and enriched in step 1902. The motivation behind these steps is that the analysis results are not only going to be stored as-is by the system, but will also serve as source of data for providing valuable reports, dashboards, and/or insights for the end customers. In order to create these analysis results, there is potentially a need for the data in the persistent storage that is not available directly from the analysis results received by the analysis results storing component 108. That is, the analysis results can have a timestamp associated with the data, but for future reports it can also be useful to have a clean date, week number, and/or year extracted from the timestamp, which can be included in the enriched data before saving the analysis results to persistent storage. Another example can be that data in the analysis results data storage 109 is to also have references or copies of information in other data storage areas, such as the configuration data storage 103, or any other metadata storage area, which can be enriched before saving the analysis results to the persistent storage. This step is or may be implementation-specific since each implementation of the system will have particular specifications for the data and thus specifications for enrichment. Apart from enrichment, FIG. 19 also performs anonymization of the analysis results in step 1904. This step is used if actual implementation of the system stores sensitive data or personal identifying information. During this step, the sensitive data is either safely encrypted or event deleted for security purposes. The next step is serialization of the enriched analysis results to the format required for persistence to the data storage of choice in step 1906. The actual format of serialization is or may be implementation-specific.

If the system is to collect any personal information from a video stream or user of the system and stores this personal information using the analysis results storing component 108, then the user may be provided with options to control whether the system should collect this personal information or whether removal of the personal information should be initiated.

Figure 20:
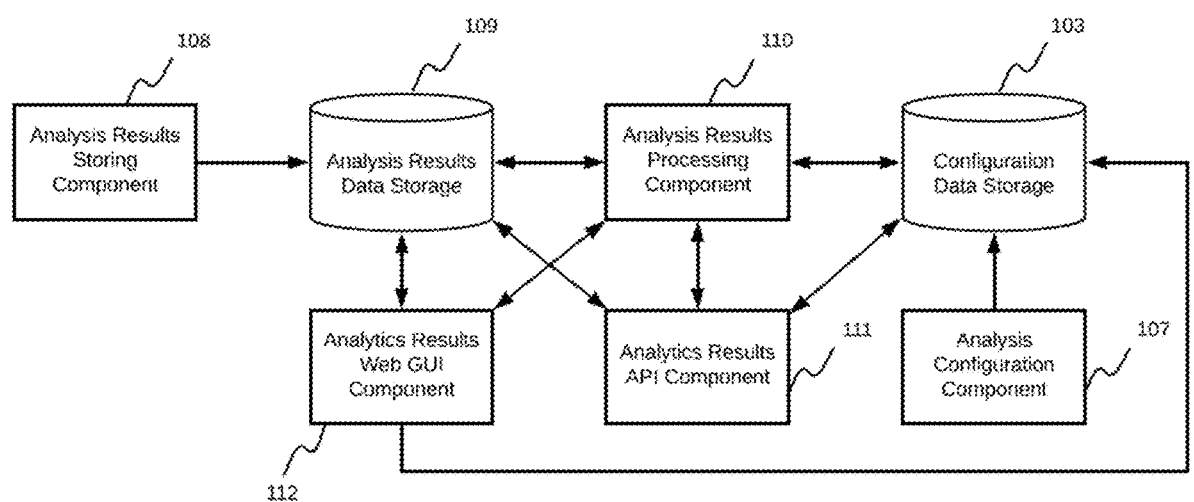
FIG. 20 shows a block diagram of an architectural embodiment of an analysis results processing and access component of the video stream real time analysis system.

FIG. 20 illustrates an embodiment of the architecture for the analysis results processing component 110 with additional detail beyond that shown in FIG. 1. The analysis results processing component 110 provides reporting and aggregating capabilities, and the analysis results storing component 108 stores raw analysis results into the analysis results data storage 109. In order for the system to effectively provide customer features, the system includes a mechanism to provide either predefined or custom reporting/analytics of results from the neural networks 1606. For example, if the video stream represents a street-view camera and the neural networks analyze people and vehicles in the FOV, then an example of reporting/analytics processing that the system provides includes the count of persons and vehicles that were visible in the video stream over the past 24 hours. Another example of reporting includes processing the detected objects in the video streams, waiting for a particular event to occur (e.g., waiting for an object to enter a scene being streamed) and then notifying the analytics results API component 111 to notify the customer, thus implementing a customer event notification process. Another example of reporting includes processing movement directions of objects and providing reports with typical movement flows and/or heatmaps. The examples discussed above are intended to be exemplary and do not limit the subject disclosure in any way.

The analysis results processing component 110 is closely integrated with the analysis results data storage 109 so that the events persisted in the analysis results data storage 109 can be accessed. Database queries typically require utilization of many of the available tools associated with a specific database engine, such as select operations, join operations, aggregating functions, window functions, temporary tables, denormalizing structures of the database tables, query performance tuning, database sharding, replication, and/or the like. The computation of aggregations is a read-only process, but can involve creation of either temporary or constant tables, views, materialized views, and/or the like. Queries to the database may be performed per-user request (pull API) using the analysis results API component 111, or may be configured as constantly working pipelines performing real-time aggregations and preparing data to have the prepared data ready for customers upon initiation of a report request.

Figure 21:
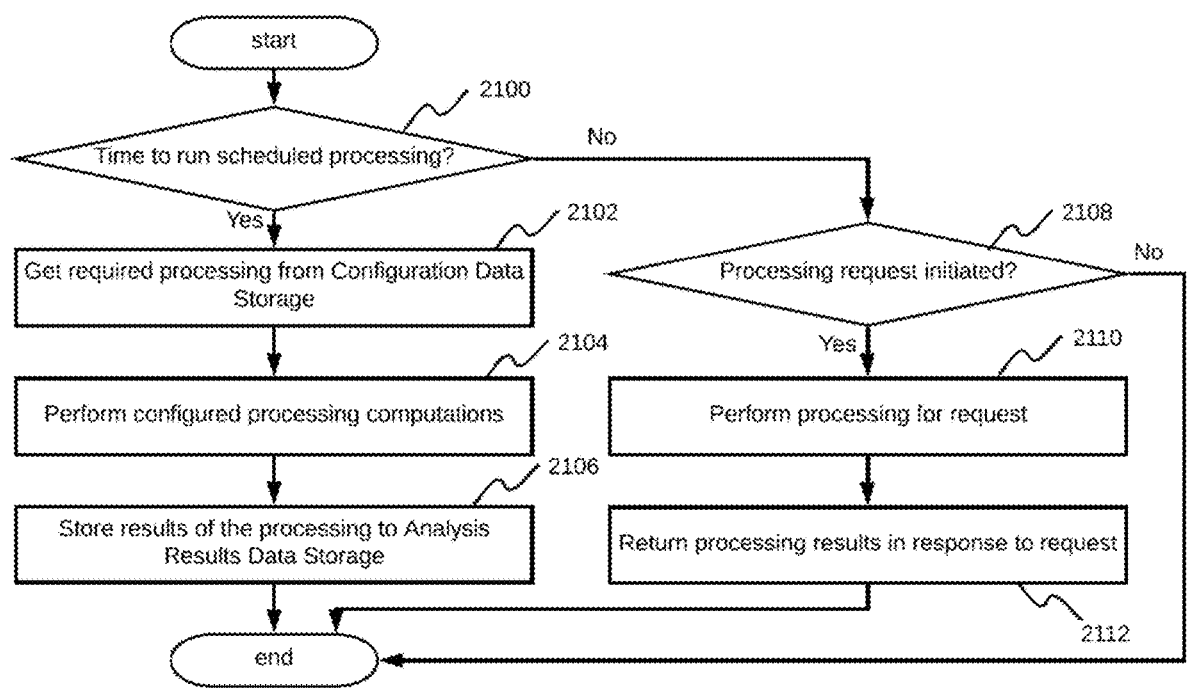
FIG. 21 shows a flowchart of a process embodiment performed by an analysis results scheduled processing component of the real-time video stream analysis system.

FIG. 21 shows a flowchart of two execution models of processing embodiments discussed above. The analysis results processing component 110 periodically checks if it is time to perform scheduled processing in step 2100, that is, if this processing is configured to occur. If so, the analysis results processing component obtains the required processing configuration from the configuration data store in step 2102. This configuration data includes a list of features to be processed that can be either a predefined set of required calculations or a customer-defined set depending on the particular implementation. After receiving the configuration data, the analysis results processing component 110 performs the calculations using the analysis data storage in step 2104, and persists calculations results back to the analysis data storage in step 2106. In this way, API components, which will be discussed below, have access to pre-calculated data if desired.

The analysis results processing component 110 processes a request initiated explicitly, that is, without being configured to do so as determined in step 2100, such as during consumption of the pull API, push API, or when the analysis results Web GUI component 112 is requested to do so by the customer in step 2108. These situations share the same attribute, which is that their goal is to obtain the most accurate data at any given moment of time. A goal of the periodic scheduled processing described above is to provide pre-calculated data, which is used for performance optimizations that may lead to a lag-time associated with providing this information, or whenever data for a prior time period is requested as determined in step 2108. In response to a processing request being initiated, the analysis results processing component 110 performs calculations concerning the retrieved data in step 2110, and returns results of processing this data in response to the initial request in step 2112. Many of the features concerning the analysis results processing component 110 discussed above are or may be implementation-specific.

The system provides reports and/or analytics for customer usage. Two techniques for accessing the analytics include automatically using the analysis results API component 111, and manually using the visual tool of the analysis results Web GUI component 112. So that these components can obtain reports that are available to customers, these components are connected to the analysis results processing component 110 and the analysis results data storage 109. These connections provide the ability for reports retrieval components to have access to both ready or precalculated data, which is stored in data storage, and to perform filtering and/or selection of the reports data using the analysis results processing component 110. These connections meet the needs for reports retrieval components. The disclosed embodiments can provide access to pre-calculated reporting data with or without real-time processing and/or filtering.

The analysis results API component 111 provides multiple API types, which include the pull API and the push API. The pull API is designed for cases in which customers explicitly request analytics results or reports individually. This can occur through an explicit call to the API, which specifies the required report by its name and/or identifier, and parameters, such as time frame of the report, customer internal identifier, video stream device 100 identifier, and/or the like. Precise information concerning any given report, such as its parameters and API format (e.g., HTTP REST, GRPC, and/or the like) is or may be implementation-specific. The pull API is publicly accessible by clients and is implemented in a secure manner, such as by supporting TLS, and should support versioning to enable the system to support different types of available reports over the lifetime of the system.

It should be noted that the term explicitly request, which is used to describe how customers initiate usage of the pull API, does not require the customer to manually execute the API call. The term explicitly is intended to indicate that the request initiator is external to the disclosed system. Actual initiation of the pull API request may be performed either manually by customers or can be automated on the customer's side, that is, customers may have the API that utilizes the pull API.

Figure 22:
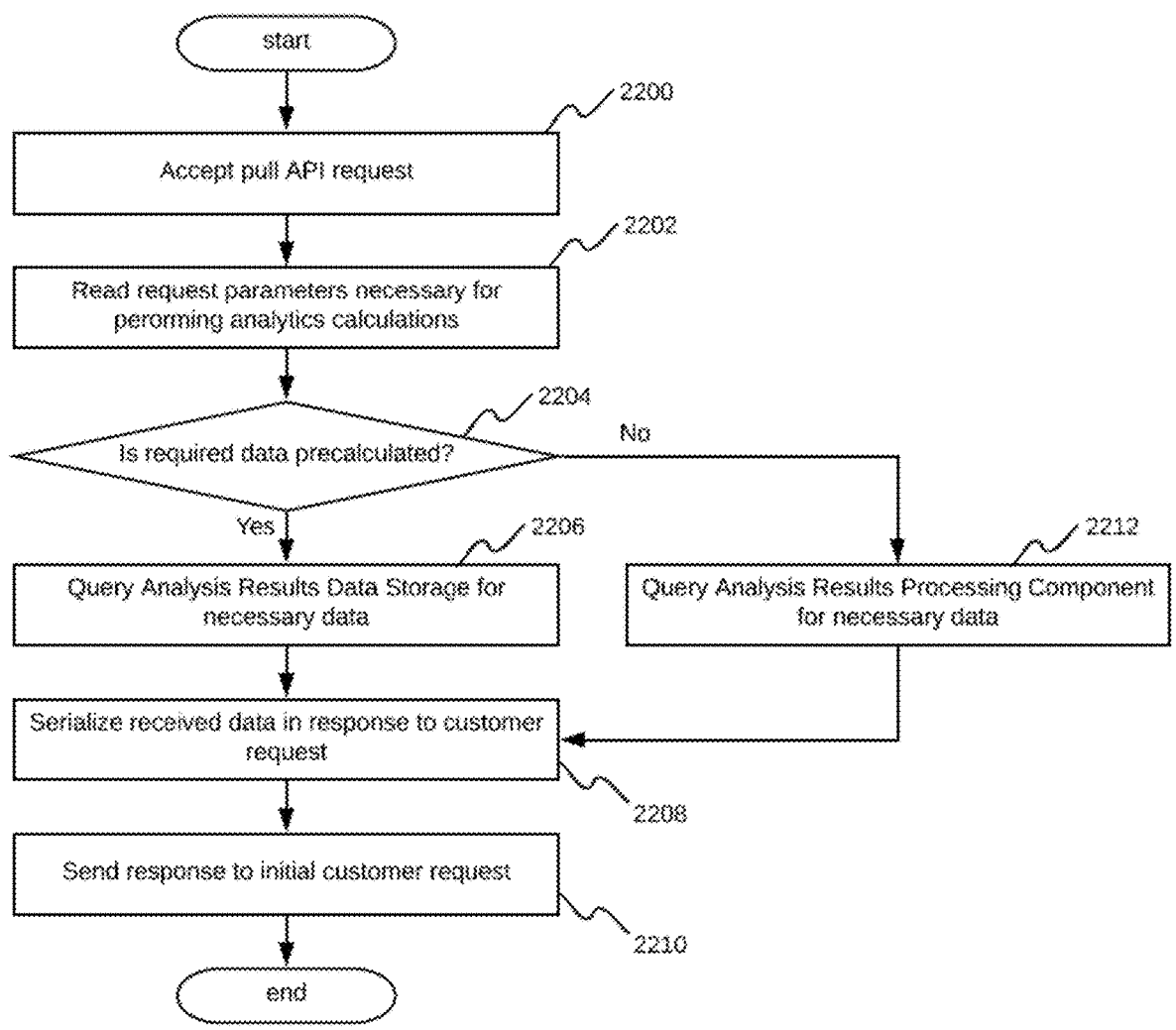
FIG. 22 shows a flowchart of a process embodiment performed by a pull API execution component of the real-time video stream analysis system.

FIG. 22 shows a flowchart of an embodiment of the pull API process. Once the pull API request is received by the analysis results API component 111 in step 2200, the pull API request is analyzed for required parameters in step 2202, such as reports identifiers, time frames, and/or the like. The analysis results API component then analyzes if the request data has been pre-calculated and is available in the analysis results data storage 109 in step 2204. If so, the analysis results API component 111 sends a request to the analysis results data storage 109 for the requested data in step 2206, after which the analysis results API component 111 serializes, in step 2208, and writes the received data in response to the customer's pull API request in step 2210. If the requested data is not pre-calculated, then the analysis results API component 111 requests that the analysis results processing component 110 calculate the required data and return the calculated data in step 2212. Once the response from the analysis results processing component 110 is retrieved, the received data is also serialized, in step 2208, and written in response to the customer's pull API request in step 2210.

Another aspect of the pull API is that it can be implemented in one of at least two ways, which include blocking and non-blocking. Blocking assumes a mode in which the flow of request processing includes request initiation, request result waiting, and request result reading. The request is considered blocked while the request is waiting for the results, and thus blocks a single connection between the client and the server, while blocking the single connection from being re-used for any other client and server communication. In cases in which such a call is initiated by a customer's code, rather than manually, this code is blocked until analysis results are returned. Such a mode can be used for very fast report requests, such as those taking less than a few seconds, but is unacceptable for long-running report requests that take many seconds or minutes to be executed. For example, a report request to receive data for the past hour may be a fast report request since there is only a small quantity of data to select and return. In contrast, a report request to return data for the past six months would be an example of long-running or slow report since there is a large quantity of data to select and return. Computation of long-running reports can take minutes or even hours, which does not provide an acceptable performance time if the customer calling code calls the request in blocking mode. This is why, for long-running report requests, the pull API is implemented in a non-blocking manner. There are multiple approaches to implementing the non-blocking technique, one of which is discussed below as an example. In this way, the flow of request processing is as follows: the request is initialized; the system accepts the request and assigns the request a unique identifier; the identifier is immediately returned to the customer; the system prepares analysis results in the background; the customer makes periodic status requests to the pull API which include the request identifier; the system responds with status in progress while the report is being prepared and responds with done once the report is finally prepared; and the customer repeats the status calls while the customer receives the in progress status. Once the customer receives the done status, the customer can then read the results from the response. The system also provides report results as part of the done status response. The algorithms discussed above are intended to provide example embodiments without limiting the disclosure thereto.

In addition to the pull API, which is explicitly invoked by the customer, the push API is used in cases in which the system sends analysis results to the customer without the customer's interaction. Such a mode can be used by the system to release the customer from the burden of automatic calls to the pull API, or when the customer accesses analysis results at predefined times, such as hourly, daily, weekly, when a specific event occurs in the video stream and the customer is to be notified about it (e.g., object appears and/or leaves the video stream scene), and/or the like. In such cases, the system may be configured to provide the analysis result at predefined moments of time and send the analysis result to the customer. Configuration of the type of analysis result and when the analysis report is to be provided is performed by the analysis configuration component 107. Once the system obtains information regarding what type of analysis result is configured and prepares the desired analysis results, the system sends the analysis results to the customer using the network. In order to do this, the analysis configuration component 107 also provides techniques to configure the network address, which includes the IP address and/or DNS name of the customer API service. Such a configuration may also include a security configuration, credentials configuration, VPN configuration, and/or the like, in addition to the target network address. With this configuration data, the system has a full set of metadata properties regarding the customer API service and can perform the push API.

Figure 23:
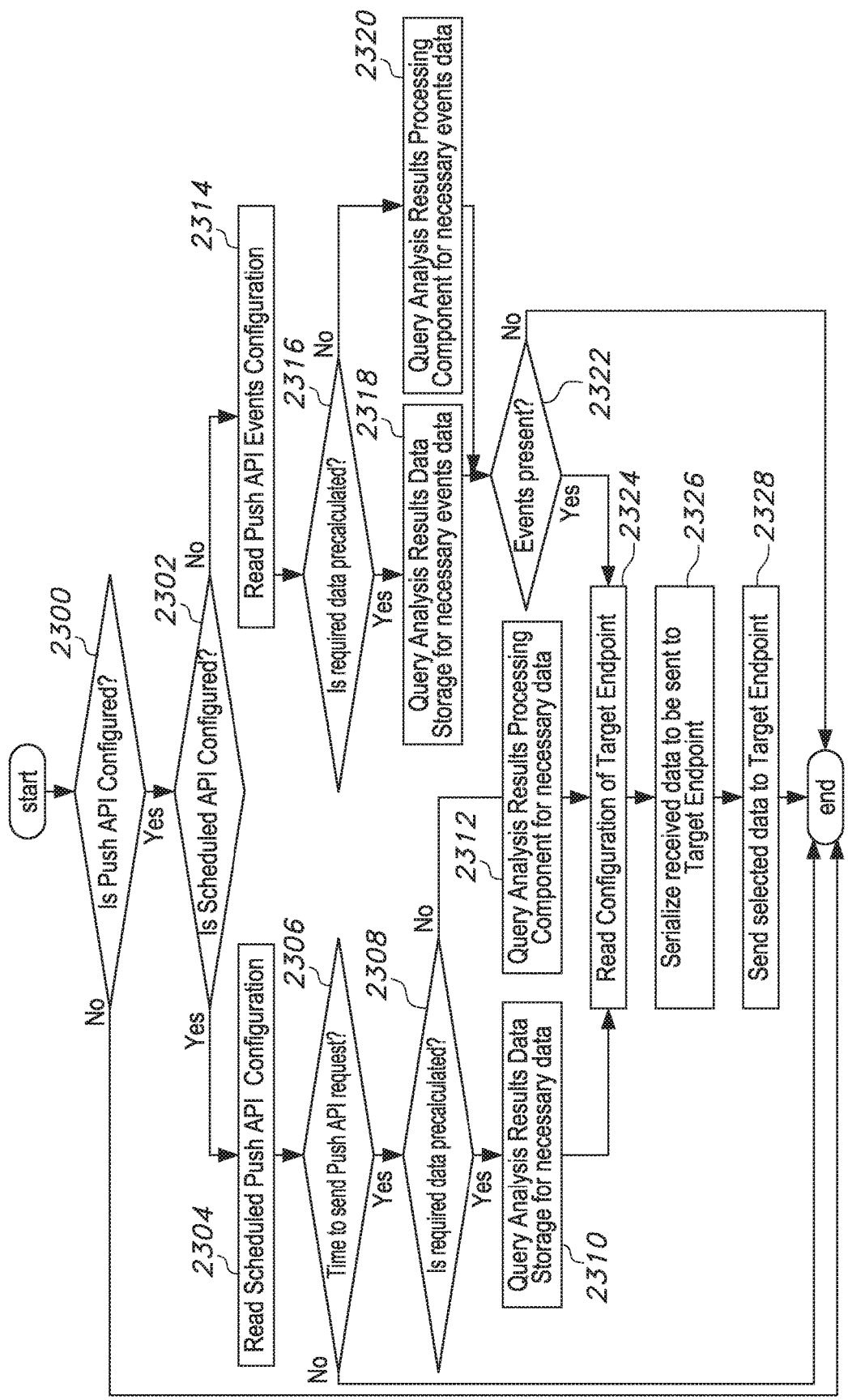
FIG. 23 shows a flowchart of a process embodiment performed by a pull API execution component of the real-time video stream analysis system.

FIG. 23 shows a flowchart of an embodiment of the push API. Since customers may not need the push API, the analysis results API component 111 checks if the push API is configured in step 2300 and, if not, the analysis results API component 111 performs no action and exits the process. The analysis results API component 111 determines if the scheduled push API is configured in step 2302. If so, the analysis results API component 111 reads the corresponding analysis configuration in step 2304, which includes information regarding when and what data needs to be pushed to the customer's target endpoint. With this information, whether it is time to send the configured report and/or analytics to the customer is next determined in step 2306. If not, execution stops and the process is restarted following a predefined delay. If it is, then (in a manner similar to that described above regarding the pull API) the analysis results API component 111 determines if required data is pre-calculated and available in the analysis results data storage 109 in step 2308. If so, the data is read from the analysis results data storage 109 in step 2310. If not, an explicit analysis data processing request is made to the analysis results processing component 110 in step 2312, which then calculates and returns the required reports and/or analytics data. Following either of these two paths the analysis results processing component 110 has data to be sent to the customer's target endpoint.

If there was no scheduled push API configured, then the push API events have been configured and the analysis results processing component 110 reads the configuration of the required event notifications for the customer in step 2314. Once the configuration is read, the analysis results processing component 110 determines if required events data is available in the analysis results data storage 109 in step 2316. If so, the events data is read from the analysis results data storage 109 in step 2318. If not, an explicit analysis data processing request is made to the analysis results processing component 110 in step 2320, which then calculates and returns the events data. Once the response from the analysis results processing component 110 is received, the analysis results API component 111 determines if the returned events data is not empty in step 2322. If it is empty, then execution is halted and the loop restarts after a predefined delay. If events data is present, the events data can be sent to the customer's target endpoint in step 2328.

After either scheduled data or events data is collected, the analysis results API component 111 reads the configuration of the target endpoint, to which the data is to be sent, in step 2324. As discussed above, the configuration data may not only include the actual URL of the endpoint, but also security configuration data. The data to be sent is then serialized to the format that the target endpoint expects (HTTP, GRPC, and/or the like) in step 2326. The serialized data is then sent to the configured target endpoint in step 2328, after which the push API process terminates. Actual implementation details of the push API are or may be implementation-specific.

The above described analysis results API component 111 enables automatic access to analysis results provided by the system. The analysis results Web GUI component 112 provides visual access to the analysis results. In order for the analysis results Web GUI component 112 to obtain reports that are to be displayed to customers using the GUI, the analysis results Web GUI component 112 is connected to the analysis results processing component 110 and the analysis results data storage 109. These connections provide the ability for the analysis results Web GUI component 112 to have access to both ready or precalculated data, which is stored in data storage, and to have the ability to perform filtering of the reports data using the analysis results processing component 110. In some embodiments, these connections can be supported simultaneously. Since the system is operable in the cloud, the analysis results Web GUI component 112 can provide the Web GUI in the form of one or more web pages. The actual structure of these web pages is or may be implementation-specific. The web pages may include, for example, the following: user interface (UI) controls to specify the required report by its name and/or identifier; UI controls to specify required parameters, such as timeframe of the report, customer internal identifier, authentication information, video stream device 100 identifier, and/or the like. Analysis results are displayed in the form of UI controls showing plain text, tables, charts, and/or the like, which is or may be implementation-specific.

Figure 24:
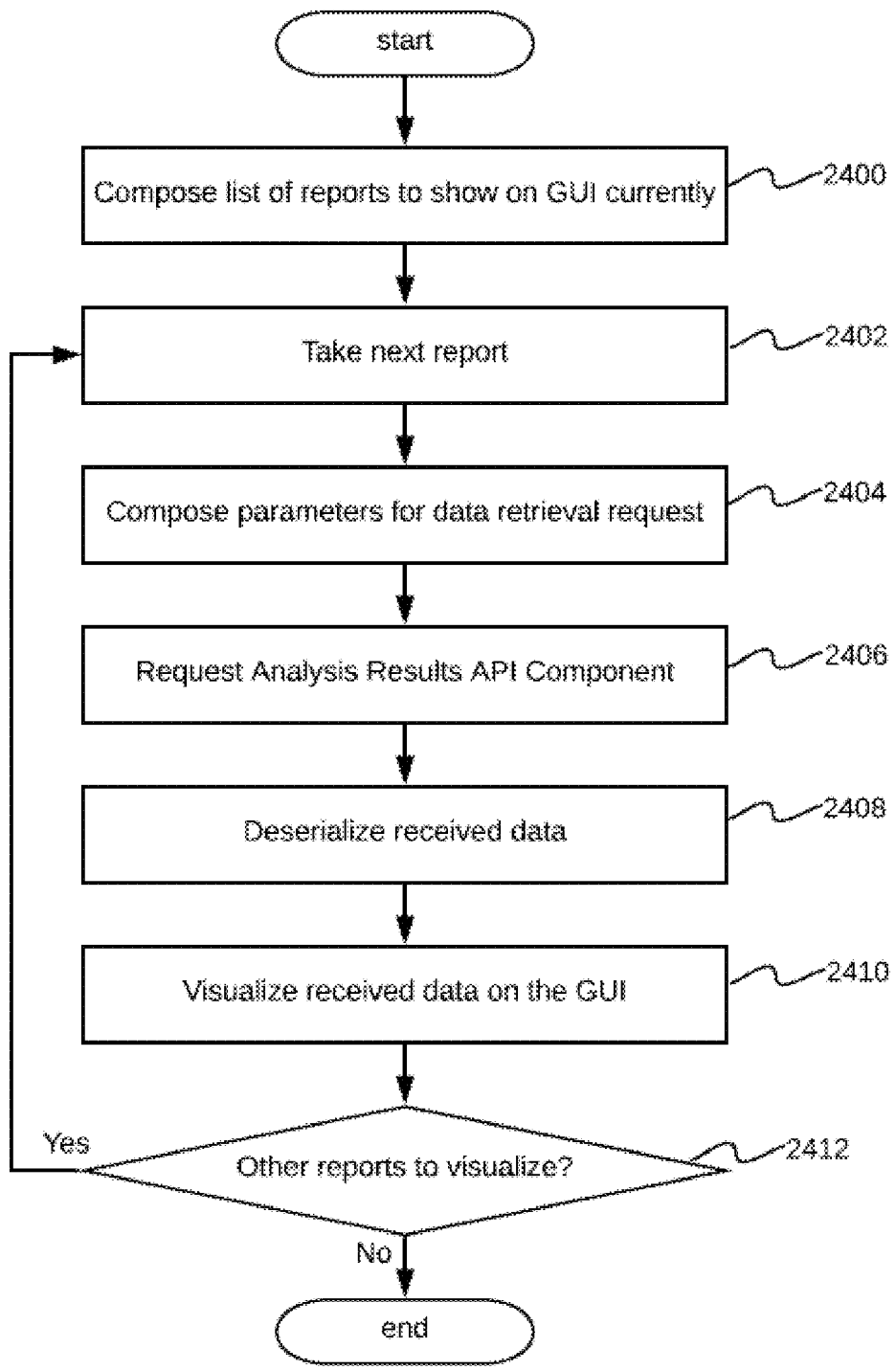
FIG. 24 shows a flowchart of a process embodiment performed by a graphical user interface (GUI) execution component of the real-time video stream analysis system.

FIG. 24 shows a flowchart of one embodiment of a process performed by the analysis results Web GUI component 112. The analysis results Web GUI component 112 defines a list of reports (or widgets) that are to be visualized and supplied with data in step 2400. Such a list can include one or more reports to be shown on a current Web GUI page, or a list of reports that the analysis results Web GUI component 112 is to pre-populate with data before being shown to the customer. After this list is prepared, the analysis results Web GUI component 112 initiates a loop, each iteration of which operates on a report starting with step 2402. First, the analysis results Web GUI component 112 defines the parameters that are to be passed to future report data requests to obtain results in step 2404. As discussed above, these parameters can include a customer identifier, report identifier, timeframe, date scale, and/or the like. When the list of all parameters is ready, a request is made to the analysis results API component 111 in step 2406. Once a response from the analysis results API component 111 is received, the analysis results Web GUI component 112 deserializes the received data in step 2408. The analysis results Web GUI component 112 now has data that enables the analysis results Web GUI component 112 to visualize the processed report in step 2410. Thereafter, the analysis results Web GUI component 112 iterates a loop by determining if there are other reports to visualize in step 2412. This loop ends when all reports have been populated with the required data. Thereafter, the analysis results Web GUI component 112 can display the requested information on the GUI. Additional details concerning parameters, such as data format, report format, visualization tools, and/or the like are or may be implementation-specific.

Figure 25:
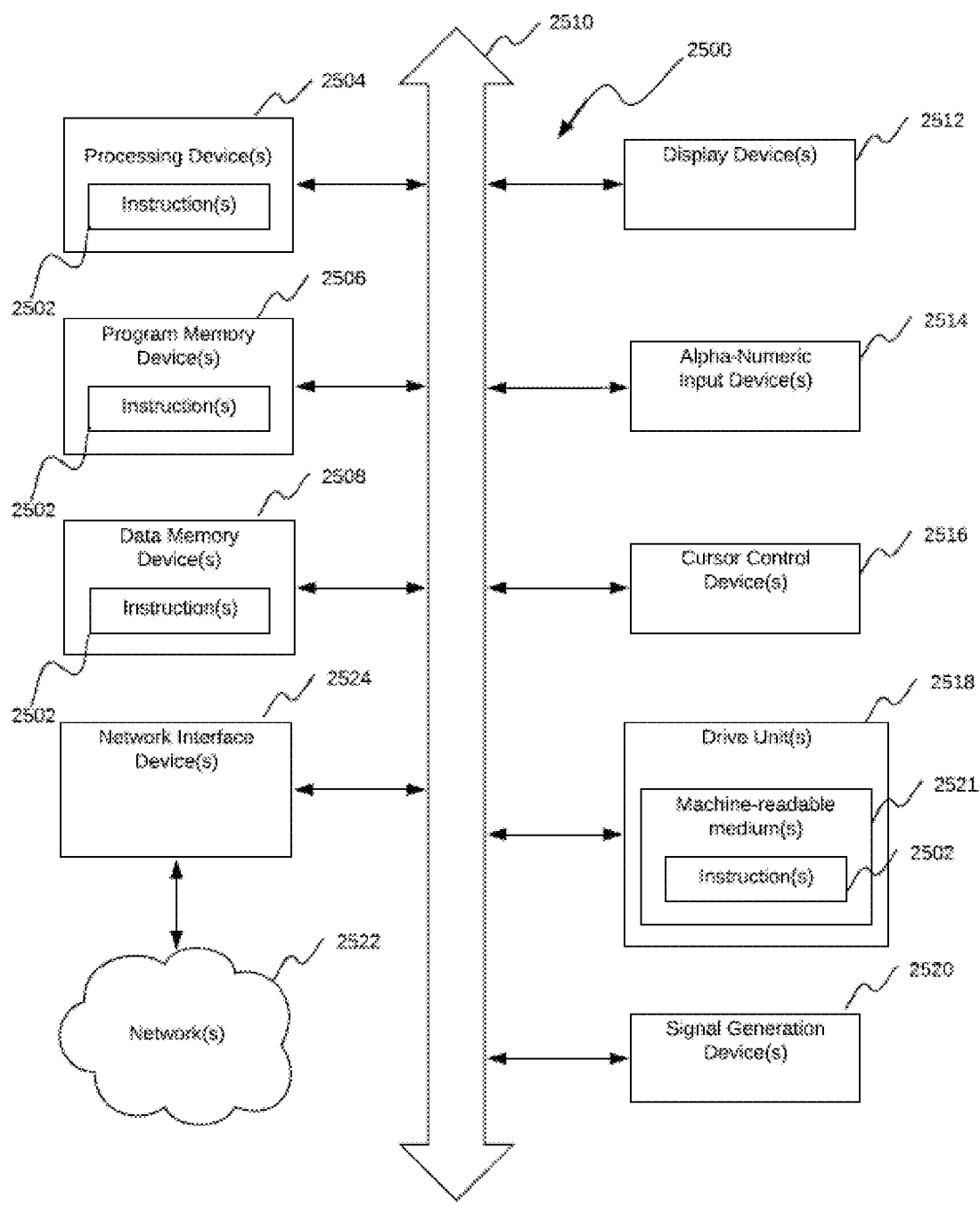
FIG. 25 shows a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 25 is a block diagram of an embodiment of a machine in the form of a computing system 2500, within which is a set of instructions 2502 that, when executed, cause the machine to perform any one or more of the methodologies according to embodiments of the invention. In one or more embodiments, the machine operates as a standalone device; in one or more other embodiments, the machine is connected (e.g., via a network 2522) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 2500 includes a processing device(s) 2504 (e.g., a central processing unit (CPU), a graphics processing unit (GPU), or both), program memory device(s) 2506, and data memory device(s) 2508, which communicate with each other via a bus 2510. The computing system 2500 further includes display device(s) 2512 (e.g., liquid crystal display (LCD), flat panel, solid state display, or cathode ray tube (CRT)). The computing system 2500 includes input device(s) 2514 (e.g., a keyboard), cursor control device(s) 2516 (e.g., a mouse), disk drive unit(s) 2518, signal generation device(s) 2520 (e.g., a speaker or remote control), and network interface device(s) 2524, operatively coupled together, and/or with other functional blocks, via bus 2510.

The disk drive unit(s) 2518 includes machine-readable medium(s) 2521, on which is stored one or more sets of instructions 2502 (e.g., software) embodying any one or more of the methodologies or functions herein, including those methods illustrated herein. The instructions 2502 may also reside, completely or at least partially, within the program memory device(s) 2506, the data memory device(s) 2508, and/or the processing device(s) 2504 during execution thereof by the computing system 2500. The program memory device(s) 2506 and the processing device(s) 2504 also constitute machine-readable media. Dedicated hardware implementations, such as but not limited to ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term processing device as used herein is intended to include any processor, such as, for example, one that includes a CPU (central processing unit) and/or other forms of processing circuitry. Further, the term processing device may refer to more than one individual processor. The term memory is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 2512, input device(s) 2514, cursor control device(s) 2516, signal generation device(s) 2520, etc., can be collectively referred to as an input/output interface, and is intended to include one or more mechanisms for inputting data to the processing device(s) 2504, and one or more mechanisms for providing results associated with the processing device(s). Input/output or I/O devices (including but not limited to keyboards (e.g., alphanumeric input device(s) 2514, display device(s) 2512, and the like) can be coupled to the system either directly (such as via bus 2510) or through intervening input/output controllers (omitted for clarity).

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

An integrated circuit in accordance with the embodiments of the present invention can be employed in essentially any application and/or electronic system in which buffers are utilized. Suitable systems for implementing one or more embodiments of the invention include, but are not limited, to personal computers, interface devices (e.g., interface networks, high-speed memory interfaces (e.g., DDR3, DDR4), etc.), data storage systems (e.g., RAID system), data servers, etc. Systems incorporating such integrated circuits are considered part of embodiments of the invention. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 2502, or that which receives and executes instructions 2502 from a propagated signal so that a device connected to a network environment 2522 can send or receive voice, video or data, and to communicate over the network 2522 using the instructions 2502. The instructions 2502 are further transmitted or received over the network 2522 via the network interface device(s) 2524. The machine-readable medium also contains a data structure for storing data useful in providing a functional relationship between the data and a machine or computer in an illustrative embodiment of the systems and methods herein.

While the machine-readable medium 2502 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding, or carrying a set of instructions for execution by the machine and that cause the machine to perform anyone or more of the methodologies of the embodiment. The term machine-readable medium shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term embodiment merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

It is to be understood that the above description and drawings are intended to be illustrative, and not restrictive. Many other embodiments will be apparent to those skill in the art upon reading and understanding the above description. Moreover, the techniques described above could be applied to other types of data and could be implemented via other tools instead of, or in addition to, those described and/or referenced herein. The scope of the disclosure should, therefore, be determined with reference to the appended claims, along with the full scope of equivalents to which such claims are entitled.

What is claimed is:

1. A cloud-computing based video processing system comprising:
   a register, the register registering configuration information associated with video information received by the cloud-computing based video processing system, the configuration information comprising at least one of access information, communication information, metadata, an area of interest, analysis information, or processing information;

a scaler, the scaler requesting and scaling computing resources based on the video information received by the cloud-computing based video processing system, the computing resources including:

a filter, the filter filtering a video frame of the video information such that all but an area of interest is excluded in a filtered video frame;

a configurator operable to arrange a plurality of neural networks in a particular configuration, the particular configuration being at least one of a parallel configuration, a sequential configuration, or a mixed parallel and sequential configuration that provides a configured plurality of neural networks, wherein each neural network is operable to detect a different object in the video information, wherein the configurator sets the particular configuration for the video information in response to stored neural network configuration information associated particularly with the video information;

a processor, the processor processing the filtered video frame using the configured plurality of neural networks that provides insight information, the insight information comprising object counts and movements of the objects in the video information;

a display, the display providing the insight information to a user; and a memory, the memory storing the configuration information and insight information in persistent cloud-based storage.

2. The cloud-computing based video processing system, as defined by claim 1, further comprising representing the area of interest as a polygon.

3. The cloud-computing based video processing system, as defined by claim 1, wherein the video information comprises at least one of a live video stream, a pre-recorded video stream, a standalone individual video frame, or an image.

4. The cloud-computing based video processing system, as defined by claim 1, wherein the insight information is based on an object detected in the filtered video frame and attributes associated with the object.

5. The cloud-computing based video processing system, as defined by claim 1, wherein a plurality of areas of interest are defined for the video information, and wherein the configurator sets the particular configuration as a mixed parallel and sequential configuration such that for each frame of the video information each of at least two of the plurality of areas of interest are processed in parallel by a respective chain of neural networks of the plurality of neural networks, and wherein at least one of the respective neural network chains comprises at least two of the neural networks of the plurality in sequence.

6. The cloud-computing based video processing system, as defined by claim 1, wherein the video processing apparatus trains the plurality of neural networks to process an image comprising at least one of a predefined dimension, or a dynamic dimension.

7. A cloud-computing based method of processing video information, the video information comprising a video frame, the method comprising:

registering configuration information associated with the video information received by a cloud-computing based video processing system, the configuration information comprising at least one of access information, communication information, metadata, an area of interest, analysis information, or processing information;

requesting and scaling computing resources based on the video information received by the cloud-computing based video processing system, including:

filtering the video frame of the video information such that all but an area of interest is excluded in a filtered video frame;

configuring a plurality of neural networks in a particular configuration that is at least one of a parallel configuration, a sequential configuration, or a mixed parallel and sequential configuration that provides a configured plurality of neural networks, wherein each neural network is operable to detect a different object in the video information, wherein the particular configuration for the video information is set in response to stored neural network configuration information associated particularly with the video information;

processing the filtered video frame using the configured plurality of neural networks that provides insight information, the insight information comprising object counts and movements of the objects in the video information;

providing the insight information to a user; and storing the configuration information and insight information in persistent cloud-based storage.

8. The method, as defined by claim 7, further comprising representing the area of interest as a polygon.

9. The method, as defined by claim 7, wherein the video information comprises at least one of a live video stream, a pre-recorded video stream, a standalone individual video frame, or an image.

10. The method, as defined by claim 7, further comprising:

configuring video content metadata that provides configured video content used in processing the filtered video frame;

configuring the area of interest; and storing the configured video content metadata and the configured area of interest in the persistent cloud-based storage.

11. The method, as defined by claim 7, wherein the insight information is based on an object detected in the filtered video frame and attributes associated with the object.

12. The method, as defined by claim 7, further comprising providing the insight information in response to receiving a request for video frame processing.

13. The method, as defined by claim 7, wherein a plurality of areas of interest are defined for the video information, and wherein the particular configuration is set as a mixed parallel and sequential configuration such that for each frame of the video information each of at least two of the plurality of areas of interest are processed in parallel by a respective chain of neural networks of the plurality of neural networks, and wherein at least one of the respective neural network chains comprises at least two of the neural networks of the plurality in sequence.

14. The method, as defined by claim 7, further comprising training the plurality of neural networks to process an image comprising at least one of a predefined dimension, or a dynamic dimension.

15. The method, as defined by claim 7, further comprising training the plurality of neural networks to process at least one of a black-white image, or a color image.

16. The method, as defined by claim 7, further comprising:
scaling up a computational resource associated with the plurality of neural networks in response to receiving configuration information comprising video information to be processed, the scaling up comprising requesting a cloud provider API to provide additional computational resources; and
scaling down computational resources in response to receiving a stop command, the scaling down comprising requesting the cloud provider API to release existing computational resources used for processing the filtered video frame.

17. The method, as defined by claim 7, further comprising:
configuring a processing pipeline comprising the insight information that provides an aggregation;
executing the configured processing pipeline; and
storing the aggregation in the persistent cloud-based storage.

18. The method, as defined by claim 17, further comprising providing a content management system access to the aggregation in response to a request to initiate calculation and retrieval of the aggregation.

19. The method, as defined by claim 17, further comprising providing an API access to the aggregation in response to a request to initiate calculation and retrieval of the aggregation.

20. A non-transitory computer-readable medium storing instructions that, when executed by a processing device, perform operations comprising:
registering configuration information associated with video information received by a cloud-computing based video processing system, the configuration information comprising at least one of access information, communication information, metadata, an area of interest, analysis information, or processing information;
requesting and scaling computing resources based on the video information received by the cloud-computing based video processing system, including:
filtering a video frame of the video information such that all but an area of interest is excluded in a filtered video frame;
configuring a plurality of neural networks in a particular configuration that is at least one of a parallel configuration, a sequential configuration, or a mixed parallel and sequential configuration that provides a configured plurality of neural networks, wherein each neural network is operable to detect a different object in the video information, wherein the particular configuration for the video information is set in response to stored neural network configuration information associated particularly with the video information;
processing the filtered video frame using the configured plurality of neural networks that provides insight information, the insight information comprising object counts and movements of the objects in the video information;
providing the insight information to a user; and
storing the configuration information and insight information in persistent cloud-based storage.

21. A cloud-computing based video processing system comprising:
a register that registers configuration information associated with video information received by the cloud-computing based video processing system from a plurality of video streaming devices registered to the cloud-computing based video processing system in a virtual private network, wherein the configuration information comprises access information, communication information, metadata, area of interest information, analysis information, and processing information, wherein the area of interest information comprises user-defined coordinates of one or more polygons, and wherein each polygon comprises an object recorded in one or more video frames of the video information;
a scaler that requests and scales computing resources based on the video information received by the cloud-computing based video processing system, the computing resources comprising:
a filter that filters each video frame of the video information such that only information pertaining to the one or more polygons remains in each filtered video frame and such that all pixel values outside the one or more polygons in each filtered video frame have a zero value;
a configurator operable to arrange a plurality of neural networks in a particular configuration, the particular configuration being at least one of a parallel configuration, a sequential configuration, or a mixed parallel and sequential configuration, wherein the configurator sets the particular configuration for the video information in response to stored neural network configuration information associated particularly with the video information, and wherein a portion of the neural networks is operable to perform pre-processing of each video frame including grayscale adjustment, resizing, and normalization of each video frame, the configurator further assigning at least one neural network to each of the one or more polygons, wherein each neural network detects a different feature of its assigned polygon, and wherein the features include emotions, object types, and detected coordinates of objects;
a processor that processes each filtered video frame using the configured plurality of neural networks to provide insight information, the insight information comprising object counts, object detections, and object types in the video information, wherein the processor tracks object movements in the video information and automatically formulates the insight information and object movements in a report;
a display that provides the report to a user; and
a memory that stores the configuration information and insight information in persistent cloud-based storage.

22. A method in a cloud-computing based video processing system, the method comprising:
registering configuration information associated with video information received by the cloud-computing based video processing system from a plurality of video streaming devices registered to the cloud-computing based video processing system in a virtual private network, wherein the configuration information comprises access information, communication information, metadata, area of interest information, analysis information, and processing information, wherein the area of interest information comprises user-defined coordinates of one or more polygons, and wherein each polygon comprises an object recorded in one or more video frames of the video information;
requesting and scaling computing resources based on the video information received by the cloud-computing based video processing system comprising:
filtering each video frame of the video information such that only information pertaining to the one or more polygons remains in each filtered video frame and such that all pixel values outside the one or more polygons in each filtered video frame have a zero value;

configuring a plurality of neural networks in a particular configuration, the particular configuration being at least one of a parallel configuration, a sequential configuration, or a mixed parallel and sequential configuration, wherein the particular configuration for the video information is set in response to stored neural network configuration information associated particularly with the video information, and wherein a portion of the neural networks is operable to perform preprocessing of each video frame including grayscale adjustment, resizing, and normalization of each video frame, assigning at least one neural network to each of the one or more polygons, wherein each neural network detects a different feature of its assigned polygon, and wherein the features include emotions, object types, and detected coordinates of objects;

processing each filtered video frame using the configured plurality of neural networks to provide insight information, the insight information comprising object counts, object detections, and object types in the video information;

tracking object movements in the video information;

automatically formulating the insight information and object movements in a report;

displaying the report to a user; and storing the configuration information and insight information in persistent cloud-based storage.

* * * * *